(12) United States Patent
Toku et al.

(10) Patent No.: US 11,762,344 B2
(45) Date of Patent: Sep. 19, 2023

(54) CONTROL DEVICE, CONTROL METHOD, AND CONTROL PROGRAM

(71) Applicant: OMRON Corporation, Kyoto (JP)

(72) Inventors: Takahiro Toku, Kusatsu (JP); Yuki Ueyama, Kyoto (JP); Shuji Inamoto, Kyoto (JP); Yasuaki Abe, Takatsuki (JP)

(73) Assignee: OMRON Corporation, Kyoto (JP)

( * ) Notice: Subject to any disclaimer, the term of this patent is extended or adjusted under 35 U.S.C. 154(b) by 352 days.

(21) Appl. No.: 17/270,841

(22) PCT Filed: Feb. 25, 2020

(86) PCT No.: PCT/JP2020/007413
§ 371 (c)(1),
(2) Date: Feb. 23, 2021

(87) PCT Pub. No.: WO2020/175460
PCT Pub. Date: Sep. 3, 2020

(65) Prior Publication Data
US 2021/0311441 A1    Oct. 7, 2021

(30) Foreign Application Priority Data

Feb. 25, 2019  (JP) .................................. 2019-032026

(51) Int. Cl.
*G05B 13/04* (2006.01)
*G05B 13/02* (2006.01)

(52) U.S. Cl.
CPC ....... *G05B 13/041* (2013.01); *G05B 13/0265* (2013.01); *G05B 13/048* (2013.01)

(58) Field of Classification Search
CPC . G05B 13/041; G05B 13/0265; G05B 13/048
(Continued)

(56) References Cited

U.S. PATENT DOCUMENTS

2002/0087221 A1* 7/2002 Keeler ................ G05B 13/027
700/48
2014/0297002 A1  10/2014  Ji
(Continued)

FOREIGN PATENT DOCUMENTS

JP  2017102617  6/2017
JP  2018206362  12/2018

OTHER PUBLICATIONS

"Search Report of Europe Counterpart Application", dated Oct. 17, 2022, p. 1-p. 8.
(Continued)

*Primary Examiner* — Jigneshkumar C Patel
(74) *Attorney, Agent, or Firm* — JCIPRNET

(57) ABSTRACT

The present invention reduces the probability of malfunction occurrence when performing predictive control of a device being controlled. In this control device of one aspect of the present invention, a prediction model for a control variable is used to calculate a prediction value from a measured value of the control variable, and a desired command value of the control variable is determined by correcting a desired basic value in accordance with the calculated prediction value. The degree of correction is determined on the basis of weight. The control device controls the operation of the device being controlled according to the determined desired command value. The control device assesses whether the device being controlled is operated appropriately on the basis of monitoring data relating to the operation result of the device being controlled, and optimizes the weight of the correction to make appropriate control possible based on the assessment result.

12 Claims, 11 Drawing Sheets

(58) Field of Classification Search
USPC .......................................................... 700/28
See application file for complete search history.

(56) References Cited

U.S. PATENT DOCUMENTS

2016/0048119 A1* 2/2016 Wojsznis ............. G05B 13/048
700/11
2018/0067460 A1 3/2018 Namie

OTHER PUBLICATIONS

"International Search Report (Form PCT/ISA/210) of PCT/JP2020/007413," dated Apr. 14, 2020, with English translation thereof, pp. 1-4.
"Written Opinion of the International Searching Authority (Form PCT/ISA/237) of PCT/JP2020/007413," dated Apr. 14, 2020, with English translation thereof, pp. 1-6.

* cited by examiner

CONTROL DEVICE, CONTROL METHOD, AND CONTROL PROGRAM

CROSS-REFERENCE TO RELATED APPLICATION

This application is a 371 application of the International PCT application serial no. PCT/JP2020/007413, filed on Feb. 25, 2020, which claims the priority benefit of Japan Patent Application No. 2019-032026, filed on Feb. 25, 2019. The entirety of each of the above-mentioned patent applications is hereby incorporated by reference herein and made a part of this specification.

TECHNICAL FIELD

The present invention relates to a control device, a control method, and a control program.

BACKGROUND ART

In order to control the operation of a device being controlled, a controller such as a programmable logic controller (PLC) is generally used. Conventionally, since the computing power of the controller has been limited, the controller was configured to control the operation of the device being controlled by a relatively simple control method such as proportional-integral-differential (PID) control. However, since the computing power of the controller has improved in recent years, an advanced control method using a prediction model can be implemented.

For example, Patent Literature 1 proposes a method of implementing a prediction model in a PLC used for controlling a factory process in a chemical plant or a refinery. Specifically, there is proposed a method of collecting data showing an operation result of a system process, generating a prediction model for predicting a system state on the basis of the obtained data, and optimizing system control using the generated prediction model. According to this method, the factory process can be optimized and the probability of producing defective products can be reduced.

CITATION LIST

Patent Literature

[Patent Literature 1]
US Patent Application Publication No. 2014/0297002

SUMMARY OF INVENTION

The present inventors have found that the conventional predictive control using the prediction model for predicting the state of the device being controlled (that is, the control variable) has the following problems.

That is, in Patent Literature 1, it is assumed that the PLC is used in a relatively large-scale production device such as a chemical plant or a refinery. In the large-scale production device, for example, there is almost no setup change such as workpiece switching and adjustment. Accordingly, in model development of a predictive control system, it is possible to collect data showing control results under various situations. For that reason, it is possible to easily generate a prediction model with high prediction accuracy on the basis of the collected data.

However, when a relatively small-scale production device such as a conveyor or a press machine is a device being controlled, the setup of the production device changes frequently. Accordingly, it is difficult to sufficiently ensure a time for collecting data showing a control result in various situations. For that reason, since the collected data is biased, it is difficult to generate a prediction model with high prediction accuracy. That is, there is a probability that a prediction model with low prediction accuracy may be generated. When the predictive control of the control device is performed using this prediction model, there is a high probability that malfunctions such as production of defective products will occur.

An aspect of the present invention has been made in view of such circumstances and an objective thereof is to provide a technique for reducing the probability of malfunction occurrence when performing predictive control of a device being controlled even when not only a large-scale production device but also a relatively small-scale production device is the device being controlled.

The present invention employs the following configurations in order to solve the above-described problems.

That is, a control device according to one aspect of the present invention includes: a first acquisition unit which acquires a desired value of a control variable; a second acquisition unit which acquires a measured value of a control variable obtained by a first sensor measuring a control variable of a device being controlled; a prediction unit which calculates a prediction value of the control variable from the acquired measured value using a prediction model of the control variable; a desired correction unit which determines a desired command value of the control variable by correcting the desired basic value in response to the calculated prediction value and determines a degree of correction on the basis of a weight; an operation control unit which controls an operation of the device being controlled in accordance with the determined desired command value; a third acquisition unit which acquires monitoring data obtained by a second sensor monitoring an operation result of the device being controlled; a result determination unit which assesses whether the device being controlled is appropriately operated by the control on the basis of the acquired monitoring data; and a weight optimization unit which optimizes the weight of correction so that the device being controlled is appropriately operated on the basis of the assessment result.

The control device according to the configuration calculates the prediction value from the measured value of the control variable using the prediction model and corrects the desired basic value in response to the calculated prediction value to determine the desired command value of the control variable. At this time, the degree of correction is determined on the basis of the weight. This weight may be given separately from the control program and may be given as the internal parameter of the control program. The control device according to the configuration controls the operation of the device being controlled in accordance with the determined desired command value. Further, the control device according to the configuration acquires the monitoring data for the operation result of the device being controlled and assesses whether the device being controlled is appropriately operated on the basis of the acquired monitoring data. Then, the control device according to the configuration optimizes the weight of correction so that the device being controlled is appropriately operated on the basis of the assessment result.

That is, in the control device according to the configuration, it is possible to improve the correction process of the predictive control so that the device being controlled is appropriately operated by optimizing the weight defining the degree of correction even when a problem occurs in the predictive control due to the correction process using the prediction model. For that reason, it is possible to reduce the probability of malfunction occurrence in the device being controlled in the predictive control using the prediction model even when the prediction model having relatively low prediction accuracy is generated. Thus, according to this configuration, it is possible to reduce the probability of malfunction occurrence when performing the predictive control of the device being controlled even when not only the large-scale production device but also the relatively small-scale production device is the device being controlled.

Accordingly, when the device being controlled is the production device, it is possible to reduce the probability of defective products and improve the yield of produced products. Further, according to this configuration, since it is possible to automatically optimize the usage of the prediction model in the predictive control, it is possible to reduce the frequency of manual maintenance. For that reason, it is possible to suppress human cost and to reduce the probability of malfunction occurrence due to human factors (for example, mistakes in maintenance work).

Additionally, the control variable is, for example, a variable to be controlled such as a rotation angle and a rotation speed of a motor. The operation variable is, for example, a variable given to the device being controlled such as a voltage of a motor. The type of device being controlled may not be particularly limited and may be appropriately selected according to the embodiment. The device being controlled may be a relatively small-scale production device used in a production line of a press machine, a web transfer device, an injection molding machine, an NC lathe, an electric discharge machine, or a packaging machine. The operation of the relatively small-scale production device may be controlled by, for example, a small-scale control device represented by a PLC. Each of the control variable and the operation variable may not be particularly limited and may be appropriately selected in accordance with the device being controlled.

The desired basic value is a desired value based on operation control. The desired command value is a desired value used for controlling the operation of the device being controlled. The desired basic value may be referred to as a first desired value and the desired command value may be referred to as a second desired value. The command value given to the device being controlled as the operation variable is determined on the basis of the desired command value. At this time, the command value may be determined by known control methods such as PID control and PI control.

The prediction model is configured to predict a prediction value of the control variable at a second time after a first time from the value of the control variable (measured value or prediction value) at the first time. That is, the prediction model is configured to output the prediction value of the control variable at the second time when the value of the control variable is input at the first time. A one-time value or a plurality of values in a predetermined time interval in the past may be used for the input of the prediction model. Further, data other than the value of the control variable may be further used for the input of the prediction model. As data other than the value of the control variable, for example, a value of the operation variable, individual information of the workpiece, and the like may be input to the prediction model. The output of the prediction model may be a one-time value or may be a plurality of values in a predetermined time interval.

The type of such a prediction model may not be particularly limited and may be appropriately selected in accordance with the embodiment. The prediction model may be configured by, for example, a regression model such as an autoregressive model or may be configured by, for example, a machine learning model such as a neural network. Further, a known prediction model disclosed in, for example, Japanese Unexamined Patent Application Publication No. 2016-173686, Japanese Unexamined Patent Application Publication No. 2018-125012, and the like may be used as the prediction model. A method of generating the prediction model may not be particularly limited and may be appropriately selected in response to the type of prediction model. When the prediction model is configured by an autoregressive model, a known regression analysis method such as the least squares method may be used as the generation method. Further, when the prediction model is configured by a machine learning model such as a neural network, a known machine learning method such as an error backpropagation method may be used in the generation method.

The first sensor is configured to measure the control variable of the device being controlled. The second sensor is configured to monitor the operation result of the device being controlled. The type of each sensor may not be particularly limited and may be appropriately selected in accordance with the embodiment. For each sensor, for example, various sensors such as a camera, a position sensor, a speed sensor, a force sensor, and an encoder may be used. A method of assessing whether the device being controlled is appropriately operated may be appropriately determined by the device being controlled and the monitoring data obtained by the second sensor. The first sensor and the second sensor may be the same sensor.

In the control device according to one aspect above, the weight optimization unit may optimize the weight of correction to increase the probability that the device being controlled is appropriately operated by performing reinforcement learning based on the reward determined in response to the assessment result. According to this configuration, it is possible to appropriately optimize the weight of correction. Accordingly, it is possible to appropriately reduce the probability of malfunction occurrence in the device being controlled in the predictive control using the prediction model.

In the control device according to one aspect above, a plurality of candidates for the weight may be given, and the weight optimization unit may optimize the weight of correction so that the device being controlled is appropriately operated by selecting a candidate of the weight having the highest probability that the device being controlled is appropriately operated as a result of controlling the operation of the device being controlled in accordance with each desired command value determined by a correction using the candidate of each weight. According to this configuration, it is possible to optimize the weight of correction by a simple process of selecting an appropriate weight from a plurality of weights. Accordingly, it is possible to reduce the probability of malfunction occurrence in the device being controlled in the predictive control using the prediction model by a process with a small load.

In the control device according to one aspect above, the desired correction unit may calculate a difference between the desired basic value and the prediction value, determine a correction value on the basis of the calculated difference and the weight, and calculate the desired command value by adding the determined correction value to the desired basic value. Further, the weight may include a proportional constant and a constant term and the desired correction unit may calculate a product of the difference and the proportional constant and add the constant term to the calculated product to calculate the correction value. According to this configuration, it is possible to realize a correction process using a prediction model by a relatively simple process. Accordingly, it is possible to reduce a process load of predictive control.

In the control device according to one aspect above, the operation of the device being controlled by the control may be repeated every takt cycle and the takt cycle may include a first time interval and a second time interval after the first time interval. The first acquisition unit may acquire a desired basic value of the control variable in the second time interval and the second acquisition unit may acquire a measured value of the control variable in the first time interval. The prediction unit may calculate the prediction value of the control variable in the second time interval from the measured value of the control variable in the first time interval using the prediction model. The desired correction unit may determine the desired command value of the control variable in the second time interval by correcting the desired basic value in the second time interval in response to the calculated prediction value and the operation control unit may control the operation of the device being controlled in the second time interval in accordance with the determined desired command value. Further, the prediction unit may convert the measured value in the first time interval into a feature amount, input the converted feature amount to the prediction model, and perform a calculation process of the prediction model to acquire an output value output from the prediction model as the prediction value in the second time interval. According to this configuration, it is possible to reduce the probability of malfunction occurrence in the device being controlled repeating the operation every takt cycle.

The takt cycle is a cycle in which the device being controlled repeats an operation. When the device being controlled is a production device, the takt cycle is, for example, a time taken for processing a predetermined number of workpieces. As an example, when the device being controlled is a press machine, the takt cycle is, for example, a time for pressing one workpiece. However, the takt cycle is not limited to such an example.
A relationship between the takt cycle and the operation of the device being controlled may be appropriately determined in accordance with the embodiment. The first time interval may be referred to as an explanatory variable interval and the second time interval may be referred to as a desired correction interval. The first time interval and the second time interval may include one or more control cycles. The control cycle is a cycle in which a command value (operation variable) is given to the device being controlled. If the feature amount indicates any feature of the measured value, the type may not be particularly limited and may be appropriately selected in accordance with the embodiment. For example, the feature amount may be obtained by extracting a feature of an object used for prediction from the time-series data of the measured value. Further, for example, the feature amount may be aggregated information (for example, a time series of average values for each unit interval), a series of one interval in the past from the prediction time, or the like. As a specific example, the feature amount may be, for example, a minimum value, a maximum value, an average value, a kurtosis, a differential value, or the like.

The control device according to one aspect above may further include a data collection unit which collects the measured value of the control variable obtained by the first sensor during control assessing that the device being controlled is appropriately operated as actual value data; and a model update unit which updates the prediction model on the basis of the collected actual value data. According to this configuration, it is possible to improve the prediction model so that appropriate predictive control can be performed. Accordingly, it is possible to reduce the probability of malfunction occurrence when performing the predictive control of the device being controlled.

The control device according to one aspect above may further include a desired derivation unit which derives the desired value of the control variable for appropriately controlling the device being controlled on the basis of the collected actual value data. Then, the first acquisition unit may acquire the derived desired value as the desired basic value. According to this configuration, it is possible to improve the desired basic value so that appropriate predictive control can be performed. Accordingly, it is possible to reduce the probability of malfunction occurrence when performing the predictive control of the device being controlled.

In the control device according to one aspect above, the operation control unit may calculate a difference between the desired command value and the measured value, determine a value of the operation variable in response to the calculated difference, and give the determined value of the operation variable to the device being controlled to control the operation of the device being controlled. According to this configuration, it is possible to appropriately derive the value of the operation variable (the command value) given to the device being controlled in the predictive control.

In the control device according to one aspect above, the device being controlled may be a press machine including a mold. The control variable may be a position of the mold. The first sensor may be a position sensor configured to measure the position of the mold. The second sensor may be a camera disposed to photograph the workpiece pressed by the press machine. According to this configuration, it is possible to reduce the probability of malfunction occurrence when performing the predictive control of the press machine.

The control device according to each embodiment above directly controls the operation of the device being controlled. Further, the control device according to each embodiment above corrects the desired basic value of the control variable in response to the prediction value of the control variable measured by the prediction model. However, an application rage of the present invention may not be limited to such an example. For example, the present invention may be applied to the control device giving a command to the controller controlling the operation of the device being controlled, that is, the control device indirectly controlling the operation of the device being controlled. Further, the present invention may be applied to the control device that directly corrects the value of the operation variable (the command value) given to the device being controlled in response to the prediction value of the control variable predicted by the prediction model. The control device according to each embodiment above may be appropriately modified to be applicable to such examples.

For example, a control device according to one aspect of the present invention includes: a first acquisition unit which acquires a desired basic value of a control variable; a second acquisition unit which acquires a measured value of a control variable obtained by a first sensor measuring a control variable of a device being controlled; a prediction unit which calculates a prediction value of the control variable from the acquired measured value using a prediction model of the control variable; a desired correction unit which determines a desired command value of the control variable by correcting the desired basic value in response to the calculated prediction value and determines a degree of correction on the basis of a weight; an operation command unit which gives the determined desired command value to a controller and controls an operation of the device being controlled by the controller in accordance with the given desired command value; a third acquisition unit which acquires monitoring data obtained by a second sensor monitoring an operation result of the device being controlled; a result determination unit which assesses whether the device being controlled is appropriately operated by the control on the basis of the acquired monitoring data; and a weight optimization unit which optimizes the weight of correction so that the device being controlled is appropriately operated on the basis of the assessment result.

Further, for example, a control device according to one aspect of the present invention includes: a first acquisition unit which acquires a desired value of a control variable; a second acquisition unit which acquires a measured value of a control variable obtained by a first sensor measuring a control variable of a device being controlled; a command determination unit which calculates a difference between the desired value and the measured value and determines a reference value of an operation variable in response to the calculated difference; a prediction unit which calculates a prediction value of the control variable from the acquired measured value using a prediction model of the control variable; a command correction unit which determines a command value by correcting the reference value in response to the calculated prediction value and determines a degree of correction on the basis of a weight; an operation control unit which controls an operation of the device being controlled by giving the determined command value to the device being controlled; a third acquisition unit which acquires monitoring data obtained by a second sensor monitoring an operation result of the device being controlled; a result determination unit which assesses whether the device being controlled is appropriately operated by the control on the basis of the acquired monitoring data; and a weight optimization unit which optimizes the weight of correction so that the device being controlled is appropriately operated on the basis of the assessment result.

As another aspect of the control device according to each embodiment above, one aspect of the present invention may be an information processing method of realizing each configuration above, a program, or a storage medium which can be read by a computer or the like and store such a program. Here, the storage medium which can be read by a computer or the like is a medium which stores information of a program by an electrical, magnetic, optical, mechanical, or chemical action.

For example, a control method according to one aspect of the present invention is an information processing method allowing a computer to perform: acquiring a desired basic value of a control variable; acquiring a measured value of a control variable obtained by a first sensor measuring a control variable of a device being controlled; calculating a prediction value of the control variable from the acquired measured value using a prediction model of the control variable; determining a desired command value of the control variable by correcting the desired basic value in response to the calculated prediction value and determining a degree of correction on the basis of a weight; controlling an operation of the device being controlled in accordance with the determined desired command value; acquiring monitoring data obtained by a second sensor monitoring an operation result of the device being controlled; assessing whether the device being controlled is appropriately operated by the control on the basis of the acquired monitoring data; and optimizing the weight of correction so that the device being controlled is appropriately operated on the basis of the assessment result.

Further, for example, a control program according to one aspect of the present invention is a program allowing a computer to perform: acquiring a desired basic value of a control variable; acquiring a measured value of a control variable obtained by a first sensor measuring a control variable of a device being controlled; calculating a prediction value of the control variable from the acquired measured value using a prediction model of the control variable; determining a desired command value of the control variable by correcting the desired basic value in response to the calculated prediction value and determining a degree of correction on the basis of a weight; controlling an operation of the device being controlled in accordance with the determined desired command value; acquiring monitoring data obtained by a second sensor monitoring an operation result of the device being controlled; assessing whether the device being controlled is appropriately operated by the control on the basis of the acquired monitoring data; and optimizing the weight of correction so that the device being controlled is appropriately operated on the basis of the assessment result.

According to the present invention, it is possible to reduce the probability of malfunction occurrence when performing predictive control of a device being controlled.

DESCRIPTION OF EMBODIMENTS

Hereinafter, an embodiment according to one aspect of the present invention (hereinafter, referred to as "this embodiment") will be described with reference to the drawings. However, this embodiment to be described below is merely exemplary of the present invention in all respects. It is needless to say that various improvements and modifications can be made without departing from the scope of the present invention. That is, a specific configuration according to the embodiment may be appropriately employed when implementing the present invention. Although the data appearing in this embodiment is described in natural language, more specifically, the data is specified in a pseudo language, a command, a parameter, a machine language, and the like that can be recognized by a computer.

§ 1 Application Example

Figure 1:
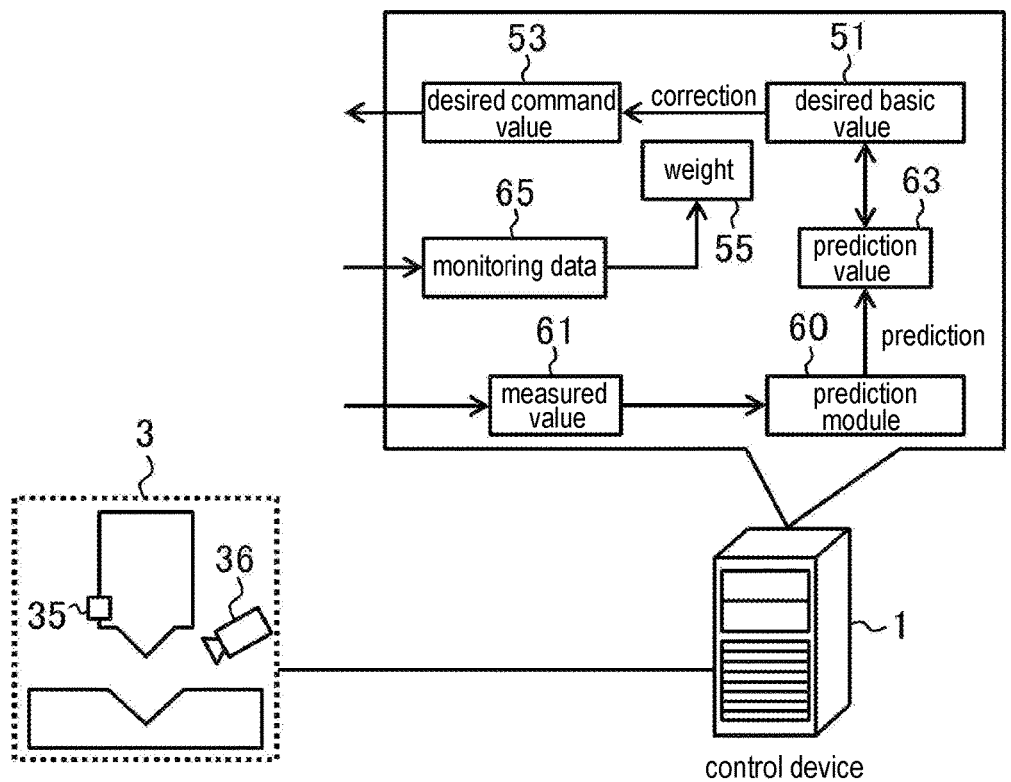
FIG. 1 schematically shows an example of a situation in which the present invention is applied.

First, an example of a situation in which the present invention is applied will be described with reference to FIG. 1. FIG. 1 schematically shows an example of a situation in which a control device 1 according to this embodiment is applied.

The control device 1 according to this embodiment is a computer that is configured to control the operation of a device being controlled. As shown in FIG. 1, the control device 1 according to this embodiment acquires a desired basic value 51 of a control variable. Further, the control device 1 acquires a measured value 61 of the control variable obtained by a first sensor that measures the control variable of the device being controlled. Next, the control device 1 calculates a prediction value 63 of the control variable from the acquired measured value 61 using a prediction model 60 of the control variable and determines the desired command value 53 of the control variable by correcting the desired basic value 51 in response to the calculated prediction value 63. The desired basic value 51 is a desired value based on the operation control. The desired command value 53 is a desired value used for the operation control of the device being controlled. The desired basic value 51 may be referred to as a first desired value and the desired command value 53 may be referred to as a second desired value.

In this embodiment, the degree of correction for the desired basic value 51 is determined on the basis of a weight 55. The control device 1 controls the operation of the device being controlled in accordance with the determined desired command value 53. Accordingly, the control device 1 according to this embodiment performs predictive control of the operation of the device being controlled using the prediction model 60. Further, the control device 1 acquires monitoring data 65 obtained by a second sensor monitoring the operation result of the device being controlled and assesses whether the device being controlled is appropriately operated in accordance with operation control on the basis of the acquired monitoring data 65. Then, the control device 1 optimizes the weight of correction so that the device being controlled is appropriately operated on the basis of the assessment result.

As described above, the control device 1 according to this embodiment can improve the correction process in the predictive control so that the device being controlled is appropriately operated by optimizing the weight 55 for determining the degree of correction even when any problem may occur in the predictive control due to the correction process using the prediction model 60. For that reason, even when the prediction model 60 having a relatively low prediction accuracy is generated, it is possible to reduce the probability of malfunction occurrence in the device being controlled in the predictive control using the prediction model 60. Thus, according to this embodiment, it is possible to reduce the probability of malfunction occurrence when performing predictive control of the device being controlled even when not only a large-scale production device but also a relatively small-scale production device is the device being controlled.

Additionally, the control variable is, for example, a variable to be controlled such as a rotation angle and a rotation speed of a motor. The operation variable is, for example, a variable given to the device being controlled such as a voltage of a motor. The type of device being controlled may not be particularly limited and may be appropriately selected according to the embodiment. The device being controlled may be a relatively small-scale production device used in a production line of a press machine, a web transfer device, an injection molding machine, an NC lathe, an electric discharge machine, or a packaging machine. Each of the control variable and the operation variable may not be particularly limited and may be appropriately selected in accordance with the device being controlled.

The first sensor is configured to measure the control variable of the device being controlled. The second sensor is configured to monitor the operation result of the device being controlled. The type of each sensor may not be particularly limited and may be appropriately selected in accordance with the embodiment. Each sensor may use, for example, various sensors such as a camera, a position sensor, a speed sensor, a force sensor, and an encoder. A method of assessing whether the device being controlled is appropriately operated may be appropriately determined in accordance with the device being controlled and the monitoring data obtained by the second sensor. The first sensor and the second sensor may be the same sensor.

As shown in FIG. 1, in an example of this embodiment, the control device 1 is connected to a press machine 3 including a position sensor 35 and a camera 36. The press machine 3 is configured to produce a product by controlling a position of a mold and molding a workpiece. The position sensor 35 is configured to measure the position of the mold. The camera 36 is disposed to monitor the state of the product molded by the press machine 3. That is, the press machine 3 is an example of the device being controlled. The position sensor 35 is an example of the first sensor. The camera 36 is an example of the second sensor. In an example of this embodiment, the control device 1 can reduce the probability of malfunction occurrence when performing predictive control of the press machine 3.

§ 2 Configuration Example

[Hardware Configuration]
<Control Device>

Figure 2:
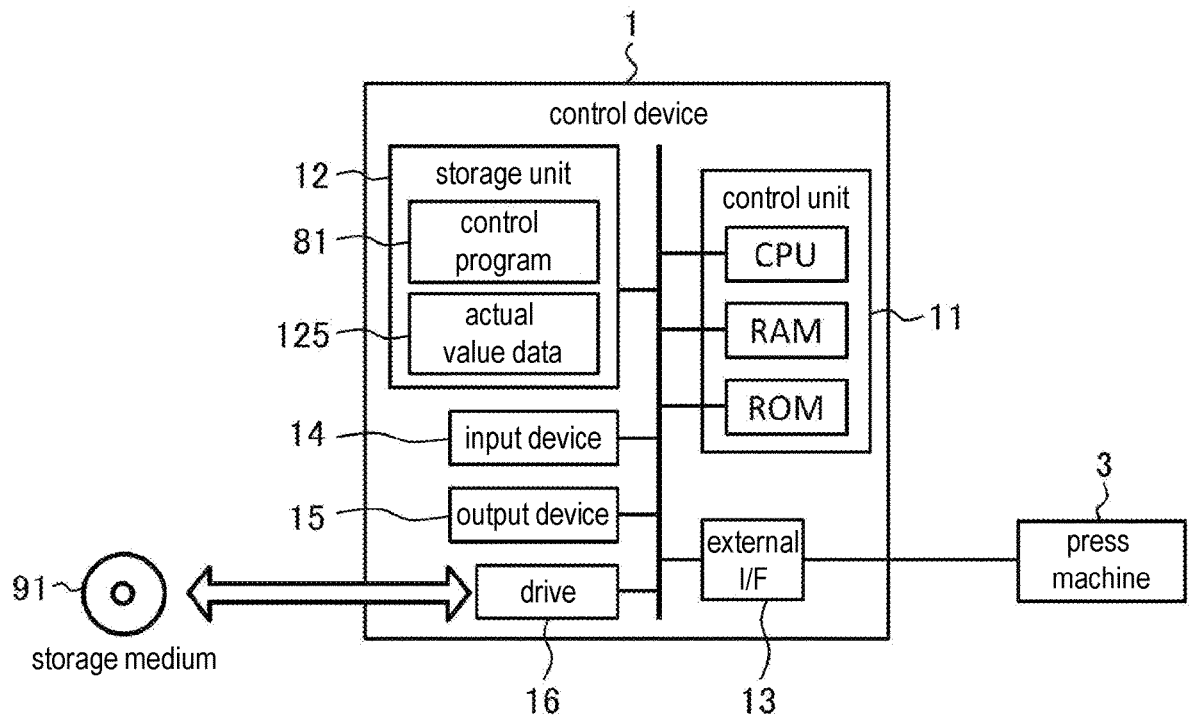
FIG. 2 schematically shows an example of a hardware configuration of a control device according to an embodiment.

Next, an example of a hardware configuration of the control device 1 according to this embodiment will be described with reference to FIG. 2. FIG. 2 schematically shows an example of the hardware configuration of the control device 1 according to this embodiment.

As shown in FIG. 2, the control device 1 according to this embodiment is a computer which is electrically connected to a control unit 11, a storage unit 12, an external interface 13, an input device 14, an output device 15, and a drive 16. Additionally, in FIG. 2, the external interface is described as "external I/F".

The control unit 11 includes a central processing unit (CPU), a random access memory (RAM), and a read only memory (ROM) which are hardware processors and is configured to execute information processing on the basis of a program and various types of data. The storage unit 12 is an example of a memory and includes, for example, RAM, ROM, and the like. In this embodiment, the storage unit 12 stores various kinds of information such as a control program 81 and actual value data 125.

The control program 81 is a program for causing the control device 1 to execute information processing (FIGS. 7A and 7B) described later that controls the operation of the device being controlled. The control program 81 includes a series of commands for the information processing. The actual value data 125 indicates a measured value of the control variable during the control in which the device being controlled is appropriately operated. The details will be described later.

The external interface 13 is, for example, a universal serial bus (USB) port, a dedicated port, or the like and is an interface for connection to an external device. The type and number of the external interface 13 may be appropriately selected in accordance with the type and number of connected external devices. In this embodiment, the control device 1 is connected to the press machine 3 via the external interface 13. Accordingly, the control device 1 can control the operation of the press machine 3 by transmitting a command value to the press machine 3. Further, the control device 1 can acquire the measured value of the control variable from the press machine 3.

The input device 14 is, for example, a device for input such as a mouse and a keyboard. Further, the output device 15 is, for example, a device for output such as a display and a speaker. An operator can operate the control device 1 by using the input device 14 and the output device 15.

The drive 16 is, for example, a CD drive, a DVD drive, or the like and is a drive device for reading a program stored in a storage medium 91. The type of drive 16 may be appropriately selected in accordance with the type of storage medium 91. At least one of the control program 81 and the actual value data 125 may be stored in the storage medium 91.

The storage medium 91 is a medium that stores information of a program by an electrical, magnetic, optical, mechanical, or chemical action so that computers, other devices, machines, and the like can read the stored information. The control device 1 may acquire at least one of the control program 81 and the actual value data 125 from the storage medium 91.

Here, FIG. 2 shows a disc type storage medium such as CD and DVD as an example of the storage medium 91. However, the type of storage medium 91 is not limited to a disc type and may be other than the disc type. As a storage medium other than the disc type, for example, a semiconductor memory such as a flash memory can be exemplified.

Regarding the specific hardware configuration of the control device 1, components can be appropriately omitted, replaced, and added in accordance with the embodiment. For example, the control unit 11 may include a plurality of hardware processors. The hardware processor may include a microprocessor, a field-programmable gate array (FPGA), a digital signal processor (DSP), and the like. The storage unit 12 may include a RAM and ROM included in the control unit 11. The storage unit 12 may include an auxiliary storage device such as a hard disc drive and a solid state drive. Further, the control device 1 may be replaced with an information processing device such as a PLC, a desktop personal computer (PC), or a tablet PC depending on the object being controlled in addition to the information processing device designed exclusively for the provided service.

<Press Machine>

Figure 3:
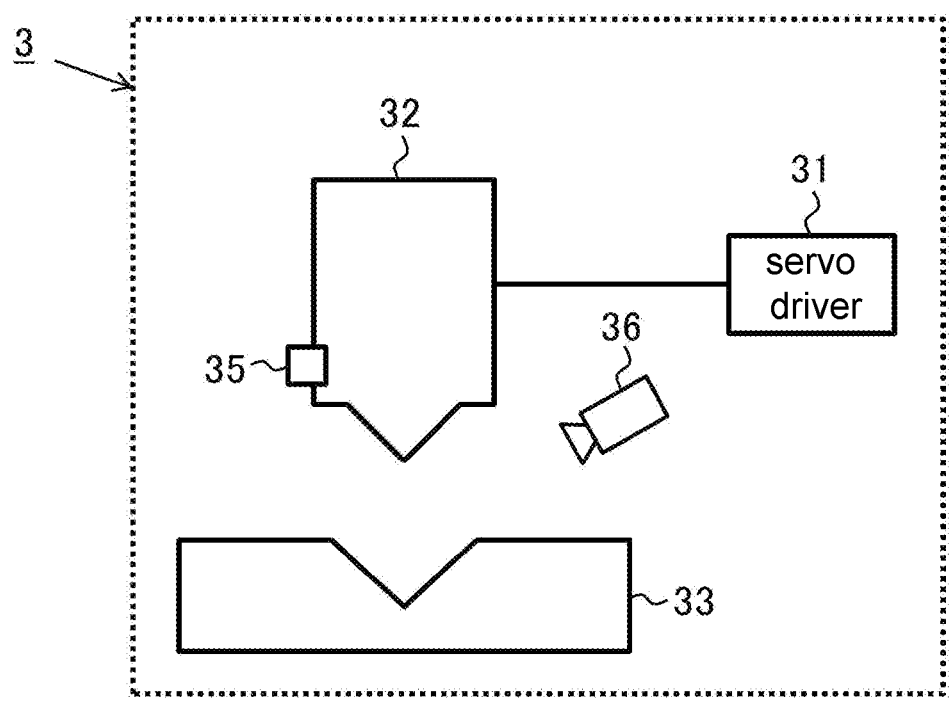
FIG. 3 schematically shows an example of a press machine (device being controlled) according to the embodiment.

Next, an example of a hardware configuration of the press machine 3 will be described with reference to FIG. 3. FIG. 3 schematically shows an example of the hardware configuration of the press machine 3 according to this embodiment.

The press machine 3 according to this embodiment includes a servo driver 31, an upper mold 32, a lower mold 33, a position sensor 35, and a camera 36. The lower mold 33 is fixed and the upper mold 32 is configured to be movable up and down by a servo motor (not shown). The position sensor 35 is configured to measure the position of the upper mold 32 with respect to the lower mold 33. Accordingly, the position of the upper mold 32 is controlled so that the upper mold presses the workpiece against the lower mold 33 to mold the workpiece or the upper mold moves away from the lower mold 33. The servo driver 31 is configured to drive the servo motor of the upper mold 32 on the basis of the command value from the control device 1. In this embodiment, a voltage of the servo motor driving the upper mold 32 is an example of the operation variable and the position of the upper mold 32 is an example of the control variable.

The camera 36 is disposed to photograph the workpiece pressed by the upper mold 32, that is, to photograph the product molded by the upper mold 32 and the lower mold 33. By analyzing image data of the product obtained by the camera 36, it is possible to assess whether the quality of the produced product is good. That is, the image data which can be obtained by the camera 36 can be used as the monitoring data for monitoring the state of the product molded by the press machine 3.

However, the configuration of the press machine 3 may not be limited to such an example. Regarding the configuration of the press machine 3, components can be appropriately omitted, replaced, and added in accordance with the embodiment. For example, both the upper mold 32 and the lower mold 33 may be configured to be movable. Further, the arrangement of the position sensor 35 may not be limited to the example of FIG. 3 and may be appropriately selected in accordance with the embodiment. The type of position sensor 35 may not be particularly limited as long as a distance between the upper mold 32 and the lower mold 33 can be measured and may be appropriately selected in accordance with the embodiment. A known sensor may be used for the position sensor 35. Further, the type of camera 36 may not be particularly limited and may be appropriately selected in accordance with the embodiment. The camera 36 may be a general camera configured to acquire an RGB image, a depth camera configured to acquire a depth image, an infrared camera configured to image an amount of infrared rays, and the like.

Figure 4A:
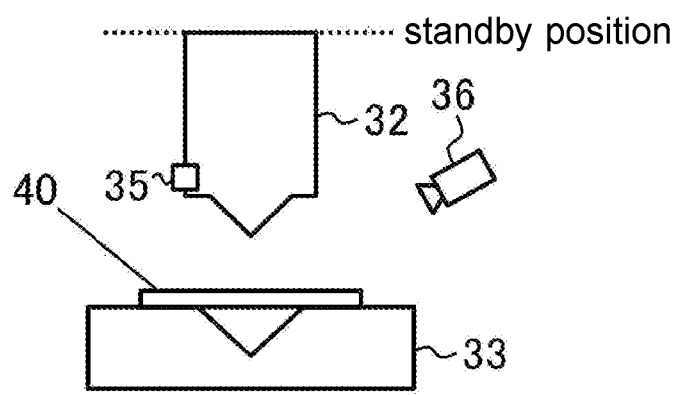
FIG. 4A schematically shows an example of a production process of the press machine of FIG. 3.

Next, an example of the production process of the press machine 3 is schematically shown with reference to FIGS. 4A to 4D. FIGS. 4A to 4D schematically show a situation in which the production process of the press machine 3 is applied. The press machine 3 may be appropriately disposed in a production line. As shown in FIG. 4A, in the initial state, the upper mold 32 is disposed at a standby position away from the lower mold 33 and waits until the workpiece 40 is conveyed to the lower mold 33. The workpiece 40 is, for example, a metallic plate material.

However, the type of workpiece 40 may not be limited to such an example and may be appropriately selected in accordance with the embodiment. The workpiece 40 may be, for example, a raw material of a product, a product before processing, a part before assembly, or the like.

Figure 4B:
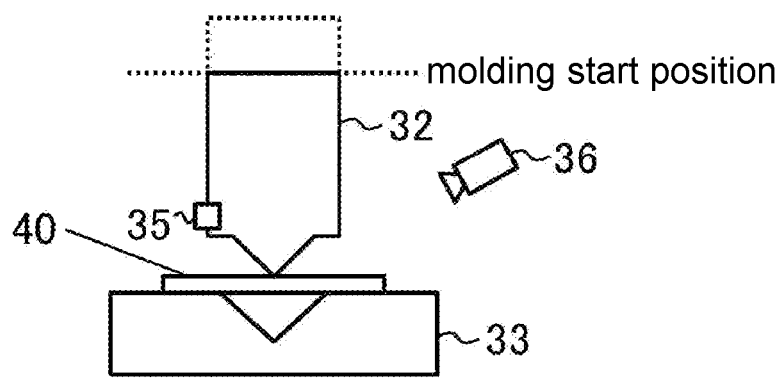
FIG. 4B schematically shows an example of the production process of the press machine of FIG. 3.

After the workpiece 40 is disposed at a predetermined position of the lower mold 33, the press machine 3 drives the servo motor of the upper mold 32 by the servo driver 31 as shown in FIG. 4B so that the upper mold 32 is disposed at a molding start position. The molding start position is, for example, a position in which the tip of the upper mold 32 comes into contact with the workpiece 40 or immediately before the workpiece.

Figure 4C:
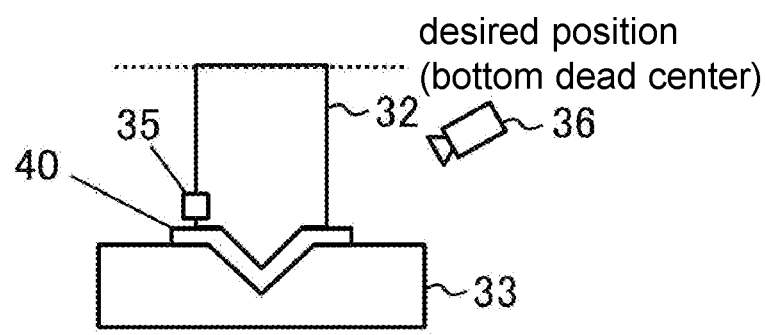
FIG. 4C schematically shows an example of the production process of the press machine of FIG. 3.

Then, as shown in FIG. 4C, the press machine 3 further drives the servo motor of the upper mold 32 by the servo driver 31 to move the upper mold 32 to a desired position (bottom dead center) and molds the workpiece 40 by the upper mold 32 and the lower mold 33. Accordingly, the press machine 3 can produce the product 41 from the workpiece 40. Additionally, the product 41 may not be particularly limited as long as the press machine 3 performs a production process on the workpiece 40 and may be a final product or an intermediate product (a product in the middle of processing).

Figure 4D:
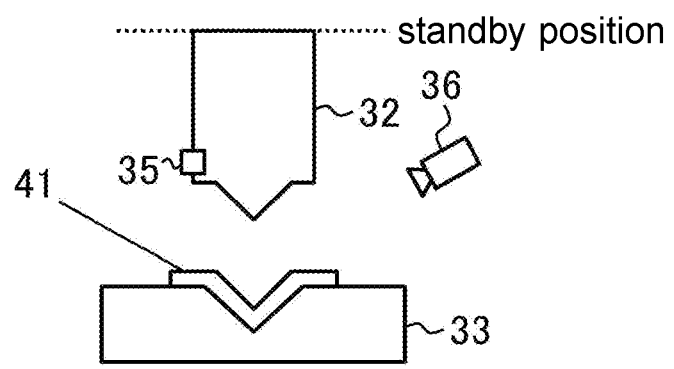
FIG. 4D schematically shows an example of the production process of the press machine of FIG. 3.

After the molding ends, the press machine 3 drives the servo motor of the upper mold 32 by the servo driver 31 so that the upper mold 32 moves to a standby position as shown in FIG. 4D. Then, the product 41 obtained by molding the workpiece 40 is conveyed from the press machine 3 by a belt conveyor (not shown) or the like. Accordingly, a series of operations in the production process for producing the product 41 from the workpiece 40 is completed.

The control device 1 can control the operation of the press machine 3 by determining a command value from the measured value and the desired value of the position of the upper mold 32 obtained by the position sensor 35 so that a series of production processes are performed by the press machine 3 and giving the determined command value to the servo driver 31. Further, the control device 1 can assess the quality of the product 41 reflected in the image data by analyzing the image data obtained by the camera 36 after the molding is completed.

[Software Configuration]

Figure 5:
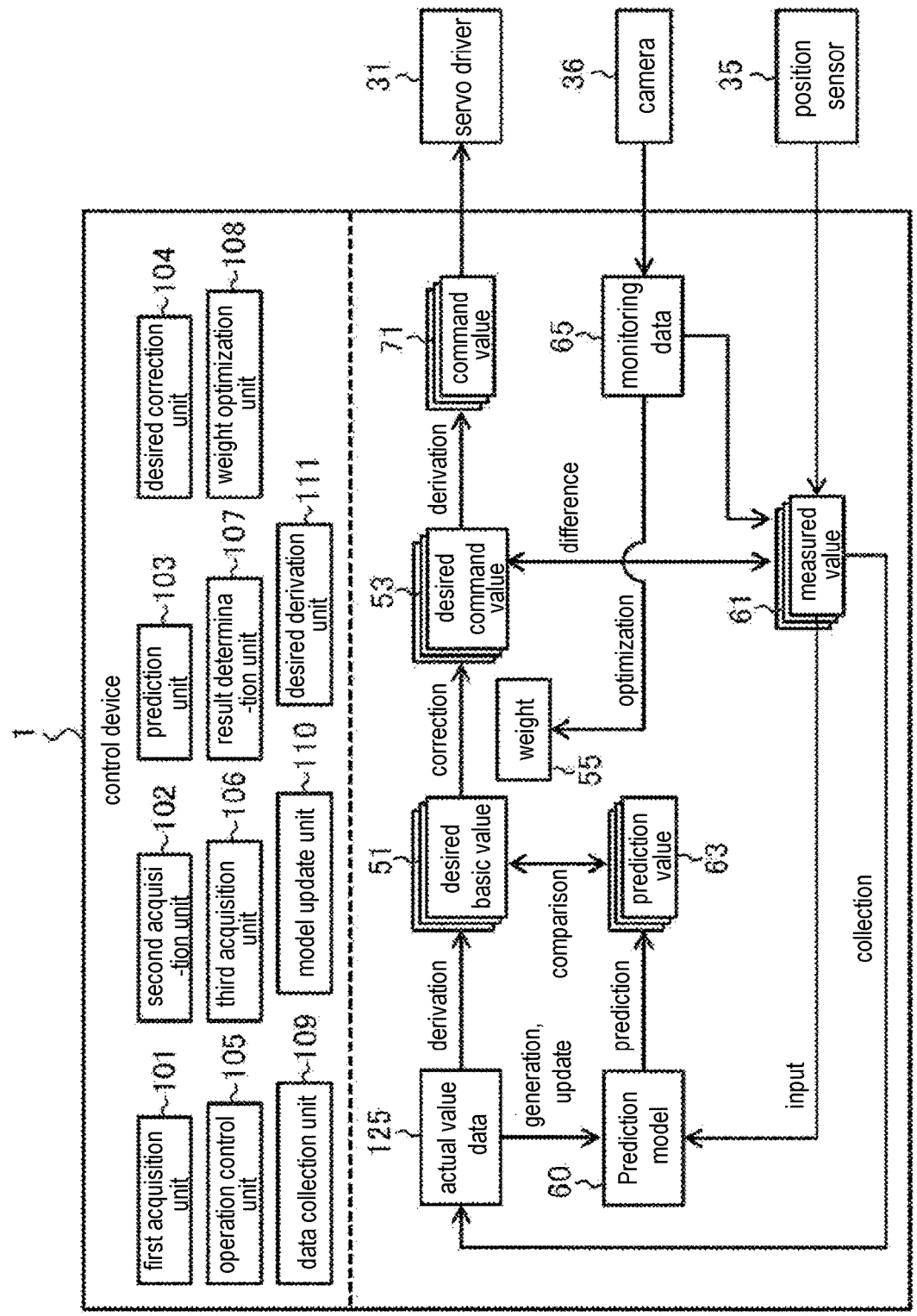
FIG. 5 schematically shows an example of a software configuration of the control device according to the embodiment.

Next, an example of a software configuration of the control device 1 according to this embodiment will be described with reference to FIG. 5. FIG. 5 schematically shows an example of the software configuration of the control device 1 according to this embodiment.

The control unit 11 of the control device 1 expands the control program 81 stored in the storage unit 12 into the RAM. Then, the control unit 11 controls each component by interpreting the control program 81 expanded in the RAM by the CPU and executing a series of command groups included in the control program 81. Accordingly, as shown in FIG. 5, the control device 1 according to this embodiment is operated as a computer including a first acquisition unit 101, a second acquisition unit 102, a prediction unit 103, a desired correction unit 104, an operation control unit 105, a third acquisition unit 106, a result determination unit 107, a weight optimization unit 108, a data collection unit 109, a model update unit 110, and a desired derivation unit 111 as software modules. That is, in this embodiment, each software module is realized by the control unit 11 (CPU).

The first acquisition unit 101 acquires the desired basic value 51 of the control variable. The second acquisition unit 102 acquires the measured value 61 of the control variable obtained by measuring the control variable of the device being controlled using the first sensor. In an example of this embodiment, the first acquisition unit 101 acquires the desired basic value 51 of the position of the upper mold 32 in the press machine 3. The second acquisition unit 102 acquires the measured value 61 of the position of the upper mold 32 obtained by the position sensor 35.

The prediction unit 103 calculates the prediction value 63 of the control variable from the acquired measured value 61 using the prediction model 60 of the control variable. The desired correction unit 104 determines the desired command value 53 of the control variable by correcting the desired basic value 51 in response to the calculated prediction value 63. The degree of correction is determined on the basis of the weight 55. The operation control unit 105 controls the operation of the device being controlled in accordance with the determined desired command value 53. The weight 55 may be given separately from the control program 81 and may be given as an internal parameter of the control program 81.

As an example of the control process, the operation control unit 105 may calculate a difference between the desired command value 53 and the measured value 61 and determine a command value 71 (a value of the operation variable) in response to the calculated difference. A method of determining the command value 71 may not be particularly limited and may be appropriately selected in accordance with the embodiment. The command value 71 may be determined by, for example, known control methods such as PID control and PI control. Then, the operation control unit 105 may control the operation of the device being controlled by giving the determined command value 71 to the device being controlled. In an example of this embodiment, the operation control unit 105 can control the position of the upper mold 32 in the press machine 3 by giving the determined command value 71 to the servo driver 31.

The third acquisition unit 106 acquires the monitoring data 65 obtained by the second sensor monitoring the operation result of the device being controlled. In an example of this embodiment, the third acquisition unit 106 can acquire the image data obtained by the camera 36 as the monitoring data 65. The result determination unit 107 assesses whether the device being controlled is appropriately operated by the control of the operation control unit 105 on the basis of the acquired monitoring data 65. The weight optimization unit 108 optimizes the weight of correction so that the device being controlled is appropriately operated on the basis of the assessment result.

The data collection unit 109 collects the measured value 61 of the control variable obtained by the first sensor during the control assessing that the device being controlled is appropriately operated as the actual value data 125. The model update unit 110 updates the prediction model 60 on the basis of the collected actual value data 125. The desired derivation unit 111 derives the desired value of the control variable for appropriately controlling the device being controlled on the basis of the collected actual value data 125. The first acquisition unit 101 may acquire the derived desired value as the desired basic value 51.

The prediction model 60 is configured to predict a prediction value of the control variable at a second time after a first time from the value of the control variable (measured value or prediction value) at the first time. That is, the prediction model 60 is configured to output the prediction value of the control variable at the second time when a value of the control variable is input at the first time. A value of one time or a plurality of values in a predetermined time interval in the past may be used for the input of the prediction model 60. Further, data other than the value of the control variable may be further used for the input of the prediction model 60. As data other than the value of the control variable, for example, a value of the operation variable, individual information of the workpiece, and the like may be input to the prediction model 60. The output of the prediction model 60 may be a value for one time or may be a plurality of values in a predetermined time interval.

Figure 6:
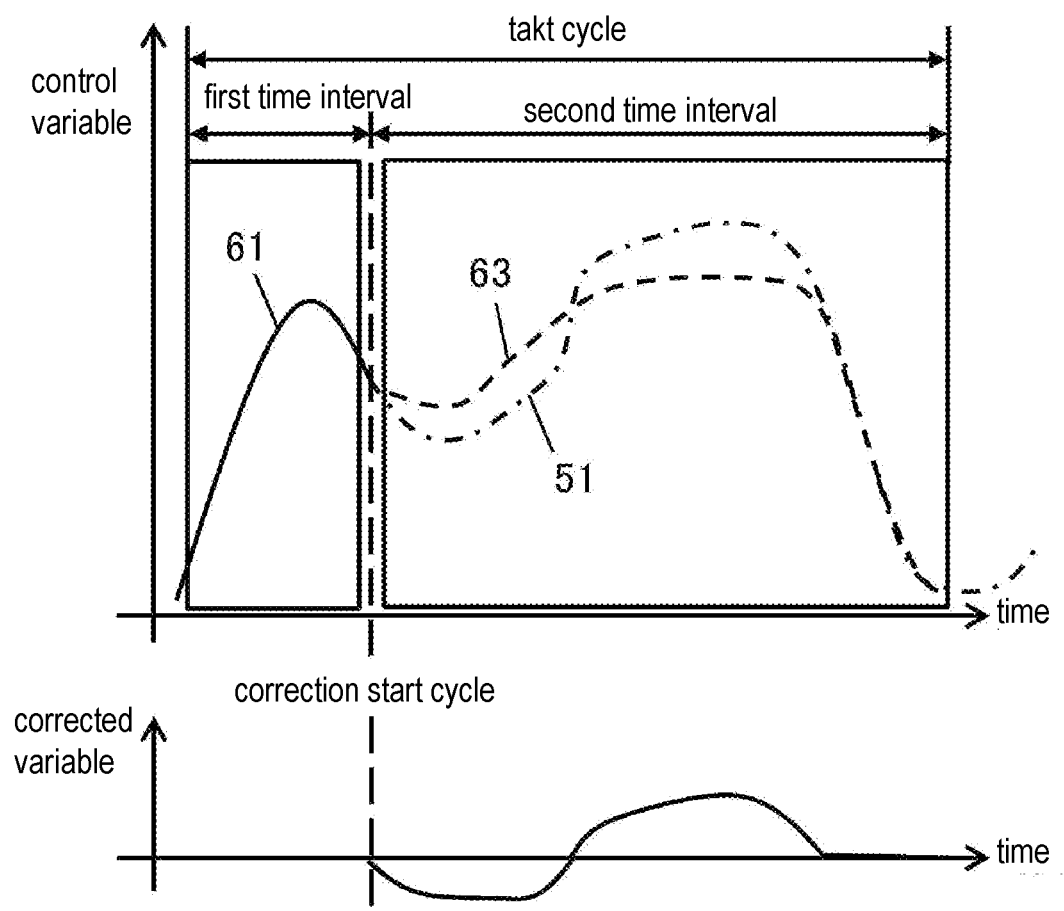
FIG. 6 schematically shows an example of a relationship between a measured value, a prediction value, and a corrected variable of a control variable.

Here, an example of a relationship between the measured value 61, the prediction value 63, and the corrected variable of the control variable in the predictive control using the prediction model 60 will be described with reference to FIG. 6. FIG. 6 schematically shows an example of a relationship between the measured value 61, the prediction value 63, and the corrected variable of the control variable. In this embodiment, the operation of the device being controlled by the control may be repeated every takt cycle. The takt cycle is a cycle for repeating the operation of the device being controlled. The takt cycle may include a plurality of control cycles. The control cycle is a cycle in which the command value 71 (the operation variable) is given to the device being controlled. When the device being controlled is a production device, the takt cycle is, for example, a time taken for processing a predetermined number of workpieces. As an example, when the device being controlled is the press machine 3, the takt cycle is, for example, a time for pressing one workpiece 40. However, the takt cycle may not be limited to such an example. A relationship between the takt cycle and the operation of the device being controlled may be appropriately determined in accordance with the embodiment.

As shown in FIG. 6, the takt cycle may include a first time interval and a second time interval after the first time interval. In the first time interval, the measured value 61 of the control variable used for the prediction is collected to calculate the prediction value of the control variable by the prediction model 60. The first time interval may be referred to as an explanatory variable interval. On the other hand, in the second time interval, the prediction value 63 of the control variable is calculated from the measured value 61 collected in the first time interval by using the prediction model 60 and the desired basic value 51 is corrected in response to the calculated prediction value 63. The second time interval may be referred to as a correction target interval. The first time interval and the second time interval may include one or more control intervals. The time width of each of the first time interval and the second time interval may be appropriately determined.

That is, the prediction model 60 may be configured to output the prediction value 63 of the control variable in the second time interval with respect to the input of the measured value 61 of the control variable in the first time interval. In this case, the time when one first time interval has elapsed from the start time of the takt cycle is the time of the correction start cycle in which the prediction value 63 of the control variable can be calculated in the second time interval. After the correction start cycle elapses, the prediction model 60 is used to calculate the prediction value 63 in the second time interval after the process time from the measured value 61 in the first time interval before the process time. For example, the prediction unit 103 may calculate the prediction value 63 in the second time interval from the measured value 61 in the first time interval before the prediction time every control cycle by using the prediction model 60 after the correction start cycle elapses.

Additionally, in the example of FIG. 6, the takt cycle is divided into two parts of the first time interval and the second time interval with the time of the correction start cycle as a boundary. In this way, when the operation of the device being controlled is repeated every takt cycle, the takt cycle may be divided into two time intervals, the previous time interval may be set as the first time interval, and the later time interval may be set as the second time interval. In this case, the prediction unit 103 may calculate the prediction value 63 in the remaining time interval (that is, the second time interval) of the takt cycle at one time after the time of the correction start cycle elapses. Accordingly, the predictive control process can be speeded. However, the relationship between the first time interval and the second time interval is not limited to such an example and may be appropriately determined in accordance with the embodiment. As described above, the prediction unit 103 may calculate the prediction value 63 at the prediction time from the measured value 61 before the prediction time every control cycle.

In response to this, the first acquisition unit 101 may acquire the desired basic value 51 of the control variable (indicated by a one-dotted chain line in the drawing) in the second time interval. Further, the second acquisition unit 102 may acquire the measured value 61 of the control variable (indicated by a solid line in the drawing) in the first time interval. The prediction unit 103 may calculate the prediction value 63 of the control variable (indicated by a dashed line in the drawing) in the second time interval from the measured value 61 of the control variable in the first time interval by using the prediction model 60. The desired correction unit 104 may determine the desired command value 53 of the control variable in the second time interval by correcting the desired basic value 51 in the second time interval in response to the calculated prediction value 63.

As shown in FIG. 6, the corrected variable may be given to reduce the deviation between the prediction value 63 of the control variable and the desired basic value 51. As an example, when the prediction value 63 is larger than the desired basic value 51, the corrected variable may be given to correct the desired basic value 51 to a small value. On the other hand, when the prediction value 63 is smaller than the desired basic value 51, the corrected variable may be given to correct the desired basic value 51 to a large value. The desired correction unit 104 may determine the desired command value 53 of the control variable in the second time interval by applying the corrected variable given in this way to the desired basic value 51. The operation control unit 105 may control the operation of the device being controlled in the second time interval in accordance with the determined desired command value 53.

Additionally, the prediction model 60 is configured to include a calculation parameter for calculating a prediction value from the input value of the control variable. The type of such a prediction model 60 may not be particularly limited and may be appropriately selected in accordance with the embodiment. The prediction model 60 may be configured by, for example, a regression model such as an autoregressive model and may be configured by, for example, a machine learning model such as a neural network. The autoregressive model is represented by a regression equation that sums one or more terms including the autoregressive coefficient. When the prediction model 60 is configured by this autoregressive model, an example of the calculation parameters is the autoregressive coefficient in each term of the autoregressive model. In addition, the neural network includes one or more layers including one or more neurons (nodes). When a plurality of layers are provided, each layer is typically arranged from the input side to the output side and neurons contained in adjacent layers are appropriately connected to each other. A weight (connection load) is set for each connection. A threshold is set for each neuron, and basically, the output of each neuron is determined by whether or not the sum of the products of each input and each weight exceeds the threshold. When the prediction model 60 is configured by this neural network, examples of calculation parameters are, for example, the weight of the connection between neurons, the threshold value of each neuron, and the like.

A method of generating the prediction model 60 may not be particularly limited and may be appropriately selected in response to the type of prediction model 60. When the prediction model 60 is configured by an autoregressive model, the prediction model 60 can be generated by deriving the calculation parameters such as the autoregressive coefficient in each term by a known regression analysis method such as the least squares method. Further, when the prediction model 60 is configured by a machine learning model such as a neural network, the prediction model 60 can be generated by deriving calculation parameters such as the weight of the connection between neurons and the threshold value of each neuron by a known machine learning method such as a backpropagation method.

Each software module of the control device 1 will be described in detail with reference to an operation example to be described later. Additionally, in this embodiment, an example in which each software module of the control device 1 is realized by a general CPU is described. However, some or all of the above-described software modules may be realized by one or more dedicated processors. Regarding the software configuration of the control device 1, software modules may be appropriately omitted, replaced, and added in accordance with the embodiment.

§ 3 Operation Example

Figure 7A:
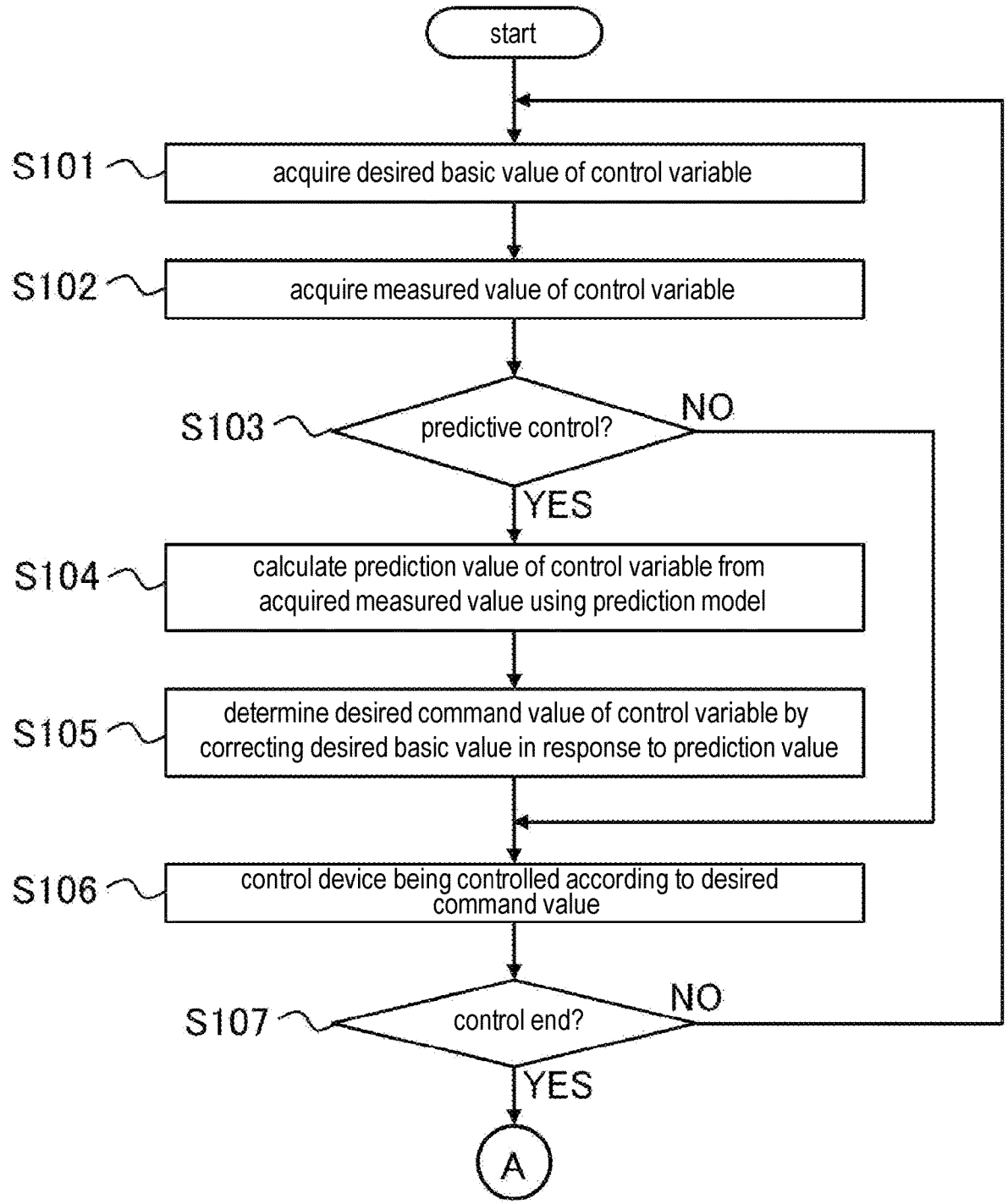
FIG. 7A shows an example of a process procedure of the control device according to the embodiment.
Figure 7B:
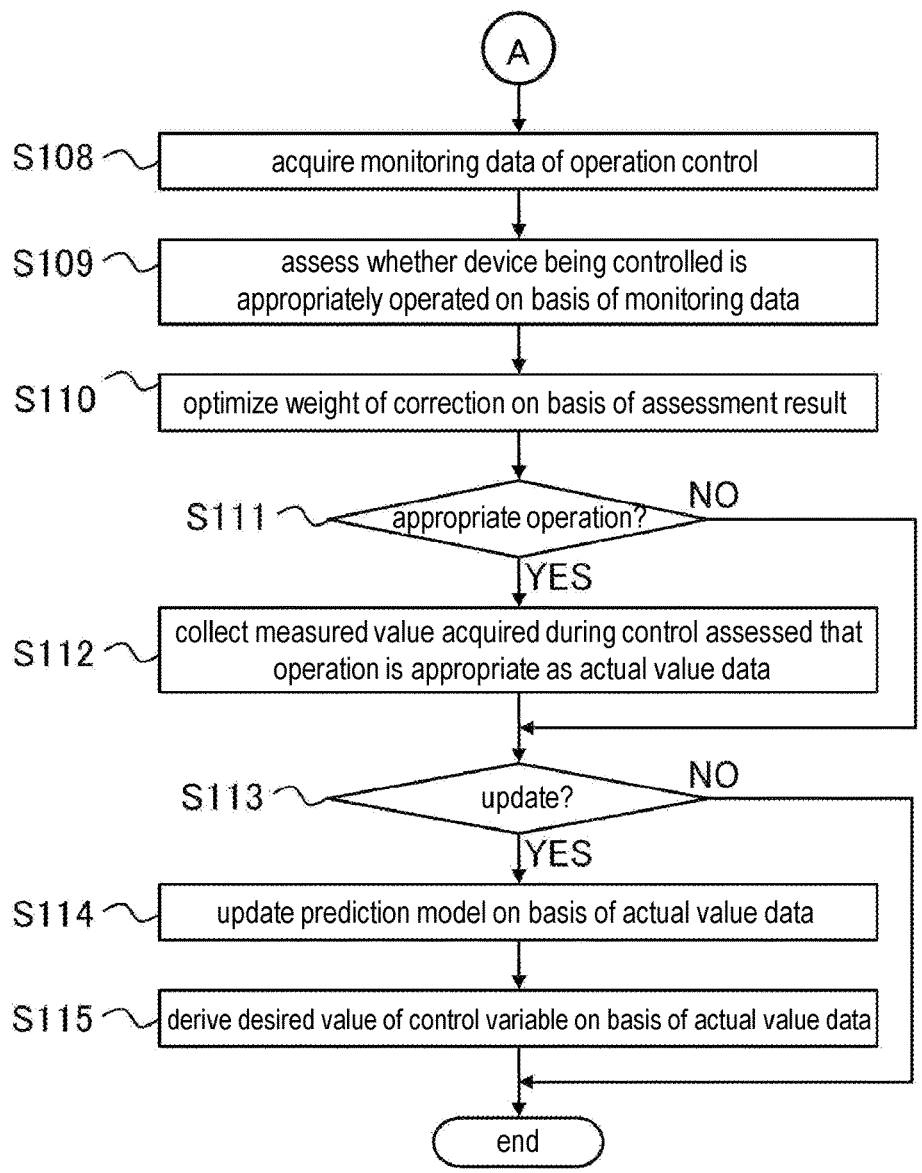
FIG. 7B shows an example of a process procedure of the control device according to the embodiment.

Next, an operation example of the control device 1 according to this embodiment will be described with reference to FIGS. 7A and 7B. FIGS. 7A and 7B are flowcharts showing an example of a process procedure of the control device 1 according to this embodiment. The process procedure of the control device 1 to be described below is an example of the "control method" of the present invention. However, the process procedure to be described below is only an example and each process may be changed as much as possible. Regarding the process procedure to be described below, steps can be appropriately omitted, replaced, and added in accordance with the embodiment. The order of process without dependencies may be changed as appropriate.

(step S101)

In step S101, the control unit 11 is operated as the first acquisition unit 101 and acquires the desired basic value 51 of the control variable.

The acquisition destination of the desired basic value 51 may be appropriately selected in accordance with the embodiment. The desired basic value 51 may be stored in, for example, a storage area such as the storage unit 12, the storage medium 91, and the external storage device. The external storage device may be, for example, a data server such as a network attached storage (NAS) and may be an external attached storage device connected to the control device 1. In this case, the control unit 11 can acquire the desired basic value 51 by accessing the storage area.

The desired basic value 51 of the control variable may be appropriately determined to cause the device being controlled to execute a predetermined operation. For example, the desired basic value 51 may be determined on the basis of the result obtained by causing the device being controlled to execute a predetermined operation by an actual machine or a simulation. Further, for example, the desired basic value 51 may be given by the designation of the operator. In this case, the control device 1 can acquire the desired basic value 51 by receiving the input of the operator via the input device 14. Further, for example, the desired basic value 51 may be derived by step S115 to be described later.

When the operation of the device being controlled is repeated every tack cycle by the control and the takt cycle includes a plurality of control cycles, the desired basic value 51 may be given for each control cycle. In this case, the control unit 11 may acquire all desired basic values 51 in the takt cycle at one time or may acquire, for example, a part of the desired basic value 51 in the takt cycle such as the desired basic value 51 in the control cycle for deriving the command value 71.

In an example of this embodiment, the device being controlled is the press machine 3 and the control variable is the position of the upper mold 32. In this case, the desired basic value 51 indicates the desired position of the upper mold 32 when molding the workpiece 40 by the production process. For example, each desired basic value 51 may be derived by determining the position of the upper mold 32 in each control cycle so that any defect caused by insufficient pressing in the product 41 does not occur on the basis of the result obtained by causing the press machine 3 to perform the operation of the production process by an actual machine or a simulation. When the desired basic value 51 is acquired, the control unit 11 proceeds to the next step S102.

(step S102)

In step S102, the control unit 11 is operated as the second acquisition unit 102 and acquires the measured value 61 of the control variable obtained by the first sensor by measuring the operation of the device being controlled.

The control variable may be measured by a simulation or an actual machine of the device being controlled. Further, the control unit 11 may directly acquire the measured value 61 of the control variable from the device being controlled or may indirectly acquire the measured value from the device being controlled, for example, via the external storage device, the storage medium 91, other information processing devices, or the like.

In an example of this embodiment, the press machine 3 includes the position sensor 35 for measuring the position of the upper mold 32 with respect to the lower mold 33 as the first sensor. The control unit 11 acquires the measured value 61 of the position of the upper mold 32 obtained by the position sensor 35. When the measured value 61 of the control variable is acquired, the control unit 11 proceeds to the next step S103.

(step S103)

In step S103, the control unit 11 is operated as the operation control unit 105 and assesses whether to perform predictive control of the device being controlled. In an example of this embodiment, the control unit 11 assesses whether to perform predictive control of the position of the upper mold 32 in the press machine 3.

It may be appropriately determined whether to perform predictive control of the device being controlled. For example, it may be determined whether to perform predictive control of the device being controlled by the command of the operator or other information processing devices other than the control device 1. In this case, the control unit 11 may assess whether to perform the predictive control in response to the command of other information processing devices or the operator.

Further, the prediction model 60 may be configured to output the prediction value 63 of the control variable in the second time interval with respect to the input of the measured value 61 of the control variable in the first time interval. In this case, the control unit 11 may assess whether to perform the predictive control in response to whether the measured value 61 is acquired in the first time interval by step S101. That is, when the measured value 61 in the first time interval is acquired, that is, the correction start cycle elapses in the takt cycle, the control unit 11 may assess that the predictive control is performed. On the other hand, in other cases, the control unit 11 may assess that the predictive control is not performed.

When it is assessed that the predictive control is performed, the control unit 11 proceeds to the next step S104. On the other hand, when it is assessed that the predictive control is not performed, the control unit 11 proceeds to the next step S106 by omitting step S104 and step S105.

(step S104)

In step S104, the control unit 11 is operated as the prediction unit 103 and calculates the prediction value 63 of the control variable from the acquired measured value 61 using the prediction model 60 of the control variable.

The prediction model 60 of the control variable may be appropriately generated. As an example, time-series data showing the transition of the value of the control variable during the control of the device being controlled for performing a predetermined operation is acquired and the prediction model 60 of the control variable can be generated by analyzing the acquired time-series data. The method of analyzing the time-series data in order to generate the prediction model 60 may not be particularly limited and may be appropriately selected in response to the type of prediction model 60.

For example, when the prediction model 60 is configured by an autoregressive model, the prediction model 60 can be generated by deriving the values of calculation parameters such as autoregressive coefficients from time-series data by a known regression analysis method such as the least squares method. Further, for example, when the prediction model 60 is configured by a machine learning model such as a neural network, the prediction model 60 can be generated by deriving the values of calculation parameters of the machine learning model according to a known machine learning method using time-series data as learning data.

As an example, when the prediction model 60 is configured by a neural network, the machine learning of the prediction model 60 is performed by using a sample of time-series data at an arbitrary time (for example, the first time interval) as training data and using a sample at a time after an arbitrary time (for example, the second time interval) as teacher data. Specifically, the prediction model 60 can be generated by adjusting the value of the calculation parameter according to an error backpropagation method and training the prediction model 60 so that an output value suitable for teacher data is output with respect to the input of the training data.

For example, when the prediction model 60 is configured to further input data other than the value of the control variable such as the individual information of the workpiece 40 and the value of the operation variable, data other than the value of the control variable may be further acquired. Then, in the above analysis process, other obtained data may be further used. For example, when the prediction model 60 is configured by an autoregressive model, other obtained data may be further used to derive an autoregressive coefficient. Further, for example, when the prediction model 60 is configured by a neural network, other obtained data may be further used as training data. Accordingly, it is possible to generate the prediction model 60 configured to output the prediction value 63 of the control variable with respect to the input of the measured value 61 of the control variable and data other than the measured value 61 of the control variable.

A process of generating the prediction model 60 may be performed by the control device 1 or may be performed by an information processing device other than the control device 1. The generated prediction model 60 may be provided to the control device 1 at an arbitrary timing before the process of step S104. The generated prediction model 60 may be stored in a predetermined storage area as generated result data (not shown). The predetermined storage area may be, for example, the storage unit 12, the storage medium 91, the external storage device, or the like. The control unit 11 may acquire the generated result data showing the generated prediction model 60 from the predetermined storage area.

Additionally, when the prediction model 60 is configured by an autoregressive model, the generated result data indicates, for example, a value of a calculation parameter such as an autoregressive coefficient derived in each term. Further, when the prediction model 60 is configured by a neural network, the generated result data indicates, for example, the value of the calculation parameter (for example, the weight of the connection between neurons, the threshold of each neuron, and the like) and the structure of the neural network (for example, the number of layers, the number of neurons contained in each layer, the connection relationship between neurons in adjacent layers, and the like).

The control unit 11 sets the prediction model 60 by referring to the generated result data. Then, the control unit 11 inputs the measured value 61 of the control variable to the set prediction model 60 and performs the calculation process of the prediction model 60. Accordingly, the control unit 11 can calculate the prediction value 63 of the control variable.

For example, when the prediction model 60 is configured by an autoregressive model, the control unit 11 sets a regression equation of the prediction model 60 by referring to the generate result data. Next, the control unit 11 inputs the measured value 61 of the control variable to each term of the regression equation and performs the calculation process of the regression equation. In accordance with the calculation result, the control unit 11 can acquire the prediction value 63 of the control variable.

Further, for example, when the prediction model 60 is configured by a neural network, the control unit 11 sets the trained neural network by referring to the generated result data. Next, the control unit 11 inputs the measured value 61 of the control variable to the input layer of the neural network and assesses the firing of each neuron contained in each layer in order from the input side. Accordingly, the control unit 11 can acquire the output value (that is, the prediction value 63 of the control variable) corresponding to the result obtained by predicting the control variable from the output layer.

Additionally, for example, when the prediction model 60 is configured to further input data other than the measured value 61 of the control variable such as individual information of the workpiece 40 and the value of the operation variable, the control unit 11 further acquires other data before step S104. A method of acquiring other data may not be particularly limited and may be appropriately determined in accordance with the embodiment. The control unit 11 can acquire the prediction value 63 of the control variable by further inputting other obtained data to the prediction model 60 and performing the calculation process of the prediction model 60.

In an example of this embodiment, the control unit 11 acquires the prediction value 63 indicating the position of the upper mold 32 predicted at the time after the time of obtaining the measured value 61. When the prediction value 63 of the control variable is acquired, the control unit 11 proceeds to the next step S105.

(step S105)

In step S105, the control unit 11 is operated as the desired correction unit 104 and determines the desired command value 53 of the control variable by correcting the desired basic value 51 in response to the calculated prediction value 63. The degree of correction is determined on the basis of the weight 55.

A relationship between the prediction value 63 of the control variable and the corrected variable for the desired basic value 51 may not be particularly limited and may be appropriately determined in accordance with the embodiment. That fact that the prediction value 63 obtained by the prediction model 60 deviates from the desired basic value 51 can correspond to the prediction that the device being controlled is operated with a behavior deviating from the desired basic value 51 due to the influence of disturbance or the like even when the device being controlled is directly controlled on the basis of the desired basic value 51. Here, the relationship between the prediction value 63 and the corrected variable may be determined to reduce, for example, the deviation between the prediction value 63 and the desired basic value 51. As an example, the relationship between the prediction value 63 and the corrected variable may be determined so that the desired basic value 51 is corrected to a large value when the prediction value 63 is smaller than the desired basic value 51 and the desired basic value 51$i$ is corrected to a small value when the prediction value 63 is larger than the desired basic value 51. Accordingly, the desired value of the control variable can be corrected so that the device being controlled can be operated with the behavior according to the desired basic value 51. A formula for calculating such a corrected variable may be given by, for example, the following formula 1.

[Math. 1]

$$R(t)=r(E(t)-P(t))+s \quad \text{(formula 1)}$$

Additionally, R(t) indicates the value of the corrected variable (the correction value) at the time t. r indicates the proportional constant. E(t) indicates the desired basic value 51 of the control variable at the time t. P(t) indicates the prediction value 63 of the control variable at the time t. s indicates the constant term.

In this formula, the degree of correction is determined by the values of the proportional constant r and the constant term s. That is, according to this embodiment, the weight 55 includes the proportional constant r and the constant term s. However, the formula for calculating the corrected variable may not be limited to the example of the formula 1 and may be appropriately determined in accordance with the embodiment. Similarly, the weight 55 may not be limited to the proportional constant r and the constant term s and may be appropriately determined to determine the degree of correction.

The values of the proportional constant r and the constant term s are optimized by step S110 to be described later. The initial values of the proportional constant r and the constant term s may be given appropriately. When the desired command value 53 is determined for each of the plurality of control cycles included in the takt cycle, at least one of the proportional constant r and the constant term s may be different between one control cycle and the other control cycle in the takt cycle. That is, a different weight 55 may be set in response to the control cycle.

The control unit 11 calculates the correction value R(t) by applying the acquired prediction value 63 and the desired basic value 51 to each term of the formula 1 and performing the calculation process of the formula 1. That is, the control unit 11 calculates the difference between the desired basic value 51 and the prediction value 63 and determines the correction value R(t) on the basis of the calculated difference and the weight 55. Specifically, the control unit 11 calculates the correction value R(t) by calculating the product of the calculated difference and the proportional constant r and adding the constant term s to the calculated product. Then, the control unit 11 calculates the desired command value 53 by adding the calculated correction value R(t) to the desired basic value 51. That is, in the predictive control according to this embodiment, the control unit 11 acquires the corrected desired value obtained by adding the correction value R(t) to the desired basic value 51 as the desired command value 53. This addition process may be realized by a subtraction process. When the desired command value 53 is determined, the control unit 11 proceeds to the next step S106.

(step S106)

In step S106, the control unit 11 is operated as the operation control unit 105 and controls the operation of the device being controlled according to the determined desired command value 53.

In this embodiment, the control unit 11 determines the command value 71 (the value of the operation variable) in accordance with the determined desired command value 53. In a situation in which the predictive control is performed, the corrected desired value obtained by step S105 is regarded as the desired command value 53. On the other hand, in a situation in which the predictive control is not performed, that is, normal control is performed, the desired basic value 51 obtained by step S101 is directly regarded as the desired command value 53.

A method of determining the command value 71 may be appropriately selected in accordance with the embodiment. In a method of determining the command value 71, for example, known control methods such as PID control and PI control may be employed. In this case, the control unit 11 calculates a difference between the desired command value 53 and the measured value 61 of the control variable and determines the command value 71 in response to the calculated difference. Specifically, the control unit 11 determines the command value 71 in response to the difference between the corrected desired value and the measured value 61 when performing the predictive control. On the other hand, the control unit 11 determines the command value 71 in response to the difference between the desired basic value 51 and the measured value 61 when not performing the predictive control. Additionally, the number of the command values 71 determined by one process may be appropriately determined in accordance with the embodiment. The control unit 11 controls the operation of the device being controlled by giving the determined command value 71 to the device being controlled.

In an example of this embodiment, the command value 71 indicates a voltage added to the servo motor driving the upper mold 32 in order to move the upper mold 32 to the desired position. The control unit 11 controls the position of the upper mold 32 in the press machine 3 by giving the command value 71 to the servo driver 31. The operation control may be performed by a simulation or an actual machine of the device being controlled. When the operation of the device being controlled is controlled by the command value 71, the control unit 11 proceeds to the next step S107.

(step S107)

In step S107, the control unit 11 is operated as the operation control unit 105 and assesses whether to end the control of the device being controlled.

It may be appropriately determined whether to end the control of the device being controlled. For example, it may be determined whether to end the control of the device being controlled by the command of the operator or other information processing devices other than the control device 1. In this case, the control unit 11 may assess whether to end the control of the device being controlled in response to the command of the operator or other information processing devices.

Further, for example, the control unit 11 may assess whether to end the control of the device being controlled depending on whether a series of operations performed in the device being controlled to mold the workpiece 40 by the production process is completed. That is, the control unit 11 may assess that the control of the device being controlled ends when a series of operations performed in the device being controlled is completed. In this case, the control unit 11 may assess that the control of the device being controlled ends in accordance with a series of operations repeated a plurality of times. Further, the control unit 11 may assess that the control of the device being controlled ends as the time of repeating a series of operations elapses by a predetermined time. On the other hand, the control unit 11 may assess that the control of the device being controlled does not end when a series of operations performed in the device being controlled are not completed.

When it is assessed that the control of the device being controlled ends, the control unit 11 proceeds to the next step S108. On the other hand, when it is assessed that the control of the device being controlled does not end, in other words, the control of the device being controlled is continued, the control unit 11 returns to step S101 and repeats the processes of step S101 to step S107.

When the processes of step S101 to step S107 are repeated, the control unit 11 controls the device being controlled to perform a predetermined operation by giving a plurality of the command values 71 to the device being controlled. In an example of this embodiment, it is possible to produce the molded product 41 by performing the control using an actual machine of the press machine 3. The timing of repeating the process and the number of the command values 71 generated by one process may not be particularly limited and may be appropriately determined in accordance with the embodiment. The control unit 11 may repeat the processes of step S101 to step S107, for example, every control cycle.

Further, in this embodiment, the operation of the device being controlled by the control of step S101 to step S107 may be repeated every takt cycle. The prediction model 60 may be configured to output the prediction value 63 of the control variable in the second time interval with respect to the input of the measured value 61 of the control variable in the first time interval. In the process of repeating this series of processes, normal control other than the predictive control may be performed while the measured value 61 of the first time interval is acquired. Then, the predictive control may be performed after acquiring the measured value 61 in the first time interval.

The control unit 11 acquires the desired basic value 51 of the control variable in the second time interval by the process of step S101 while repeating this series of processes. By the process of step S102, the control unit 11 acquires the measured value 61 of the control variable in the first time interval. In the process of step S104, the control unit 11 calculates the prediction value 63 of the control variable in the second time interval from the measured value 61 of the control variable in the first time interval by using the prediction model 60. In the process of repeating a series of processes every control cycle, the control unit 11 may calculate the prediction value 63 in the prediction time from the measured value 61 before the prediction time every control cycle after the time of the correction start cycle or calculate the prediction value 63 in the second time interval at one time. Accordingly, the control unit 11 can schedule the operation of the device being controlled while synchronizing the predictive control by the prediction model 60 with the actual environment in real time.

In the process of step S104, the control unit 11 may acquire the output value output from the prediction model 60 as the prediction value 63 in the second time interval by directly inputting the measured value 61 in the first time interval to the prediction model 60 and performing the calculation process of the prediction model 60. Alternatively, the control unit 11 may convert the measured value 61 in the first time interval into the feature amount. If the feature amount can show any feature of the measured value 61, the type may not be particularly limited and may be appropriately selected in accordance with the embodiment. For example, the feature amount may be obtained by extracting a feature of an object used for the calculation of the prediction value 63 from the time-series data of the measured value 61. Further, for example, the feature amount may be aggregated information (for example, a time series of average values for each unit interval), a series of one interval in the past from the prediction time, or the like. As a specific example, the feature amount may be, for example, a minimum value, a maximum value, an average value, a kurtosis, a differential value, or the like. The control unit 11 may acquire the output value output from the prediction model 60 as the prediction value 63 in the second time interval by inputting the obtained feature amount to the prediction model 60 and performing the calculation process of the prediction model 60.

In the process of step S105, the control unit 11 determines the desired command value 53 of the control variable in the second time interval by correcting the desired basic value 51 in the second time interval in response to the calculated prediction value 63. Then, in the process of step S106, the control unit 11 controls the operation of the device being controlled in the second time interval in accordance with the determined desired command value 53.

(step S108)

In step S108, the control unit 11 is operated as the third acquisition unit 106 and acquires the monitoring data 65 obtained by the second sensor monitoring the operation result of the device being controlled.

The process of step S108 may be performed similarly to the process of step S102. The monitoring data 65 may be acquired by a simulation or may be acquired by an actual machine of the device being controlled. Further, the control unit 11 may directly acquire the monitoring data 65 from the device being controlled or may indirectly acquire the monitoring data from the device being controlled, for example, via the external storage device, the storage medium 91, other information processing devices, or the like.

In an example of this embodiment, the press machine 3 includes the camera 36 which is disposed to photograph the product 41 molded by the upper mold 32 and the lower mold 33. The control unit 11 can acquire the image data obtained by the camera 36 as the monitoring data 65. When the monitoring data 65 is acquired, the control unit 11 proceeds to the next step S109.

(step S109)

In step S109, the control unit 11 is operated as the result determination unit 107 and assesses whether the device being controlled is appropriately operated by the control of step S101 to step S107 on the basis of the acquired monitoring data 65.

A method of assessing whether the device being controlled is appropriately operated on the basis of the monitoring data 65 may be appropriately determined in response to the operation of the device being controlled and the type of monitoring data 65. Further, a reference for assessing whether the device being controlled is appropriately operated may be appropriately given. For example, it may be assessed whether the device being controlled is appropriately operated depending on whether the device being controlled is operated within a predetermined error from the given desired basic value 51. Further, for example, when the device being controlled is a production device, it may be assessed whether the device being controlled is appropriately operated in response to the quality of the produced product.

In an example of this embodiment, the control unit 11 can acquire the image data reflecting the product 41 (the molded workpiece 40) produced by the press machine 3 as the monitoring data 65. The control unit 11 may assess whether the produced product 41 has good quality (that is, the workpiece 40 is correctly pressed) by analyzing the obtained image data. A known method may be used for the image analysis. When the produced product 41 has good quality, the control unit 11 can assess that the press machine 3 is appropriately operated. On the other hand, when the produced product 41 has bad quality, the control unit 11 can assess that the press machine 3 is not appropriately operated. When it is assessed whether the device being controlled is appropriately operated, the control unit 11 proceeds to the next step S110.

(step S110)

In step S110, the control unit 11 is operated as the weight optimization unit 108 and optimizes the weight 55 of correction so that the device being controlled is appropriately operated on the basis of the assessment result of step S109. In this embodiment, the control unit 11 can optimize the weight 55 of correction by adopting anyone of two methods below.

(A) Reinforcement Learning

In a first method, the control unit 11 uses reinforcement learning. Specifically, the control unit 11 optimizes the weight 55 of correction to increase the probability that the device being controlled is appropriately operated by performing reinforcement learning based on the reward determined in response to the assessment result. When the device being controlled is a production device, the probability that the device being controlled is appropriately operated may be replaced with, for example, the non-defective product rate of the product to be produced. Further, increasing the probability that the device being controlled is appropriately operated may be replaced with reducing the defective product rate of the produced product.

The reward is appropriately set to increase the probability that the device being controlled is appropriately operated. For example, a positive reward may be given when the device being controlled is appropriately operated and a negative reward may be given when the device being controlled is not appropriately operated. As the reinforcement learning method, a known machine learning method such as the Monte Carlo method may be used. According to the first method, the control unit 11 can appropriately optimize the weight 55 of correction on the basis of the results of multiple trials.

(B) Selection from Plurality of Candidates

In a second method, the control unit 11 optimizes the weight 55 of correction by the selection from a plurality of weight candidates. In this case, a plurality of candidates of the weight 55 are given. In an example of this embodiment, a plurality of combinations of the proportional constant r and the constant term s are given.

In step S101 to step S107 above, the control unit 11 performs the predictive control of the device being controlled by using the candidate of each weight 55. That is, the control unit 11 controls the operation of the device being controlled in accordance with each desired command value 53 determined by the correction using the candidate of each weight 55. In step S108, the control unit 11 acquires the monitoring data 65 of the predictive control using the candidate of each weight 55. In step S109, the control unit 11 calculates the probability that the device being controlled is appropriately operated as a result of the predictive control using the candidate of each weight 55. The probability may be represented by the number of times.

Then, the control unit 11 optimizes the weight 55 of correction by selecting the candidate of the weight 55 having the highest probability that the device being controlled is appropriately operated as the weight 55 used for the control. That is, in the second method, the candidate having the highest probability that the device being controlled is predictively controlled among the candidates of the plurality of weights 55 is designated as the weight 55 used for the process of step S105. According to the second method, the control unit 11 can optimize the weight 55 of correction by a simple process.

In this embodiment, the control unit 11 can optimize the weight 55 of correction so that the device being controlled is appropriately operated by employing any one of the two methods. However, a method of optimizing the weight 55 of correction may not be limited to such an example and may be appropriately selected in accordance with the embodiment. When the weight 55 of correction is optimized, the control unit 11 proceeds to the next step S111.

(step S111)

In step S111, the control unit 11 determines the branch destination of the process on the basis of the assessment result of step S109. In step S109, when it is assessed that the device being controlled is at least partially appropriately operated, the control unit 11 proceeds to the next step S112. On the other hand, when it is assessed that the device being controlled is not appropriately operated, the control unit 11 proceeds to the next step S113 by omitting the process of step S112.

(step S112)

In step S112, the control unit 11 is operated as the data collection unit 109 and collects the measured value 61 of the control variable obtained by the first sensor as the actual value data 125 during the control assessing that the device being controlled is appropriately operated. In this embodiment, the control unit 11 can generate the actual value data 125 by collecting the measured value 61 obtained by step S102 during the control in which the device being controlled is appropriately controlled.

The control unit 11 may store the actual value data 125 in a predetermined storage area. The predetermined storage area may be, for example, the storage unit 12, the storage medium 91, the external storage device, other information processing devices, or the like. The actual value data 125 may include not only data obtained by the control processes of step S101 to step S107 but also, for example, data obtained by other than the control process such as data collected in advance. In an example of this embodiment, the actual value data 125 indicates the transition of the position of the upper mold 32 capable of appropriately molding the workpiece 40 in time series. When the actual value data 125 is collected, the control unit 11 proceeds to the next step S113.

(step S113)

In step S113, the control unit 11 assesses whether to update the prediction model 60 and the desired basic value 51.

It may be appropriately determined whether to update the prediction model 60 and the desired basic value 51. For example, it may be determined whether to update the prediction model 60 and the desired basic value 51 by the command of the operator or other information processing devices other than the control device 1. In this case, the control unit 11 may assess whether to update the prediction model 60 and the desired basic value 51 in response to the command of the operator or other information processing devices.

Further, for example, when the process procedure according to this operation example is repeated, the control unit 11 may periodically or irregularly update the prediction model 60 and the desired basic value 51. As an example, the control unit 11 may assess that the update process is performed when a predetermined time elapses after the update process of the prediction model 60 and the desired basic value 51 is performed and may assess that the update process is omitted in other cases.

Further, for example, the control unit 11 may assess whether to update the prediction model 60 and the desired basic value 51 in response to the amount of the collected actual value data 125. That is, the control unit 11 may assess that the update process is performed when a sufficient amount of the actual value data 125 for update can be obtained and may assess that the update process is omitted in other cases. As an example, when the actual value data 125 indicating the transition of the measured value 61 when the device being controlled appropriately performs a predetermined operation a predetermined number of times is collected, the control unit 11 may assess that a sufficient amount of the actual value data 125 for update can be obtained.

When it is assessed that the prediction model 60 and the desired basic value 51 are updated (that is, the updating process is performed), the control unit 11 proceeds to the next step S114. On the other hand, when it is assessed that the prediction model 60 and the desired basic value 51 are not updated, the control unit 11 ends the process relating to this operation example.

(step S114)

In step S114, the control unit 11 is operated as the model update unit 110 and updates the prediction model 60 on the basis of the collected actual value data 125.

A method of updating the prediction model 60 may not be particularly limited and may be appropriately determined in accordance with the embodiment. For example, the control unit 11 generates a new prediction model by deriving the value of the calculation parameter in such a manner that at least a part of the actual value data 125 and the time-series data of the control variable used for generating the prediction model 60 is analyzed. A method of generating a new prediction model may be similar to the method described above. The control unit 11 may replace the existing prediction model used in step S104 with a new prediction model. Alternatively, the control unit 11 may store a new prediction model separately from the existing prediction model and change the prediction model 60 used in step S104 from the existing prediction model to a new prediction model. Accordingly, the control unit 11 can update the prediction model 60. Hereinafter, when the process procedure according to this operation example is repeated, the control unit 11 can use the updated prediction model 60 in the predictive control. When the prediction model 60 is updated, the control unit 11 proceeds to the next step S115.

(step S115)

In step S115, the control unit 11 is operated as the desired derivation unit 111 and derives the desired value of the control variable for appropriately controlling the device being controlled on the basis of the collected actual value data 125.

The actual value data 125 shows the measured value 61 of the control variable when the device being controlled is appropriately operated. The desired value of the control variable may be appropriately derived from the measured value 61. For example, it is assumed that the measured value 61 for a plurality of takt cycles can be obtained for each control cycle as a result of repeating the operation of the device being controlled every takt cycle. In this case, the control unit 11 may calculate an average value of the plurality of measured values 61 in the desired control cycle and employ the calculated average value in the desired value of the control variable. Further, for example, the control unit 11 may select any one of the plurality of obtained measured values 61 in the control cycle of an object and employ the selected measured value 61 in the desired value of the control variable. The method and reference to be selected may be appropriately determined. By employing one of these methods, the control unit 11 can derive the desired value of the control variable for appropriately controlling the device being controlled on the basis of the actual value data 125.

The control unit 11 may replace the existing desired basic value with the derived desired value. Alternatively, the control unit 11 may store the derived desired value separately from the existing desired basic value and change the desired basic value 51 acquired in step S101 from the existing desired basic value to the derived desired value. Accordingly, the control unit 11 can update the desired basic value 51. Hereinafter, when the process procedure according to this operation example is repeated, the control unit 11 can acquire the derived desired value as the desired basic value 51 in step S101. When the desired value of the control variable is completely derived, the control unit 11 ends the process according to this operation example.

[Feature]

As described above, the control device 1 according to this embodiment can optimize the weight 55 for defining the degree of correction by the processes of step S108 to step S110 even when any problem may occur in the predictive control due to the correction process using the prediction model 60. Accordingly, it is possible to improve the correction process in step S105 of the predictive control so that the device being controlled is appropriately operated. For that reason, even when the prediction model 60 having a relatively low prediction accuracy is generated, it is possible to reduce the probability of malfunction occurrence in the device being controlled in the predictive control using the prediction model 60. Thus, according to this embodiment, it is possible to reduce the probability of malfunction occurrence when performing predictive control of the device being controlled even when not only a large-scale production device but also a relatively small-scale production device is the device being controlled.

Accordingly, when the device being controlled is the production device, it is possible to reduce the probability of defective products and improve the yield of produced products. Further, according to this embodiment, since it is possible to automatically optimize the usage of the prediction model 60 in the predictive control, it is possible to reduce the frequency of manual maintenance. For that reason, it is possible to suppress human cost and to reduce the probability of malfunction occurrence due to human factors (for example, mistakes in maintenance work). In an example of this embodiment, it is possible to reduce the probability of malfunction occurrence when performing the predictive control of the press machine 3 and to improve the yield of the product produced by a factor process including the press machine 3. Further, it is possible to suppress human cost for a factor process including the press machine 3 and to reduce the probability of malfunction occurrence in the press machine 3 due to human factors.

Further, the control device 1 according to this embodiment can improve the prediction accuracy of the control variable by the prediction model 60 by updating the prediction model 60 using the processes of step S112 and step S114. That is, it is possible to improve the prediction model 60 so that the predictive control is appropriately performed in step S104 to step S106. Further, the control device 1 according to this embodiment can improve the desired basic value 51 so that the predictive control is appropriately performed by updating the desired basic value 51 using the processes of step S112 and step S115. Also with them, in this embodiment, it is possible to reduce the probability of malfunction occurrence when performing the predictive control of the device being controlled.

§ 4 Modified Example

Although the embodiments of the present invention have been described in detail above, the above description is merely an example of the present invention in all respects. It is needless to say that various improvements and modifications can be made without departing from the scope of the present invention. For example, the following changes can be made. In the following, the same reference numerals will be used for the same components as those in the above-described embodiment and the same points as in the above-described embodiment will be omitted as appropriate. The following modified examples can be combined as appropriate.

<4.1>

In the above-described embodiment, the number of the devices being controlled may not be limited to one and may be appropriately determined in accordance with the embodiment. Further, in an example of the above-described embodiment, the device being controlled is the press machine 3. However, the type of device being controlled may not be limited to such an example and may be appropriately selected in accordance with the embodiment. The device being controlled may be, for example, a relatively small-scale production device used in a production line of a press machine, a web transfer device, an injection molding machine, an NC lathe, an electric discharge machine, or a packaging machine other in addition to the press machine. The operation of the relatively small-scale production device may be controlled by, for example, a small-scale control device represented by PLC. Further, as an example of the above-described embodiment, the control variable is the position of the upper mold 32 and the operation variable is the voltage of the servo motor driving the upper mold 32. However, each of the control variable and the operation variable may not be limited to such an example and may be appropriately selected in response to the device being controlled. For example, when the device being controlled is a web transfer device configured to transfer a web, the control variable may be the position of the end of the web and the operation variable may be the voltage of the actuator for adjusting the position of the end of the web.

<4.2>

Further, in the above-described embodiment, the control device 1 is configured to directly control the operation of the device being controlled. However, the configuration of the control device 1 may not be limited to such an example. For example, the control device 1 may be configured to indirectly control the operation of the device being controlled by giving a command to the controller controlling the operation of the device being controlled.

Figure 8:
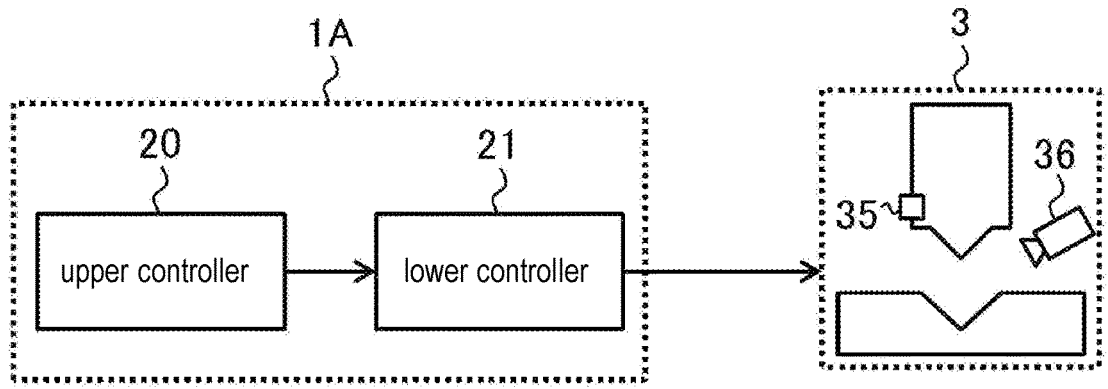
FIG. 8 schematically shows an example of another situation in which the present invention is applied.

FIG. 8 schematically shows an example of a situation in which a control system 1A according to this modified example is applied. The control system 1A according to this modified example includes an upper controller 20 and a lower controller 21 and is configured to control the operation of the device being controlled similarly to the control device 1 according to the above-described embodiment. The hardware configuration of each of the upper controller 20 and the lower controller 21 may be the same as that of the control device 1 according to the above-described embodiment. The upper controller 20 and the lower controller 21 are appropriately connected. The connection method may not be particularly limited. The upper controller 20 and the lower controller 21 may be connected to each other, for example, via mutual external interfaces or a network.

The upper controller 20 is configured to give a command to the lower controller 21 in order to control the operation of the device being controlled. The upper controller 20 corresponds to the control device 1 according to the above-described embodiment. On the other hand, the lower controller 21 is configured to control the operation of the device being controlled in response to the command from the upper controller 20. In an example of the modified example, the press machine 3 is connected to the lower controller 21. The lower controller 21 is configured to control the operation of the press machine 3.

Figure 9A:
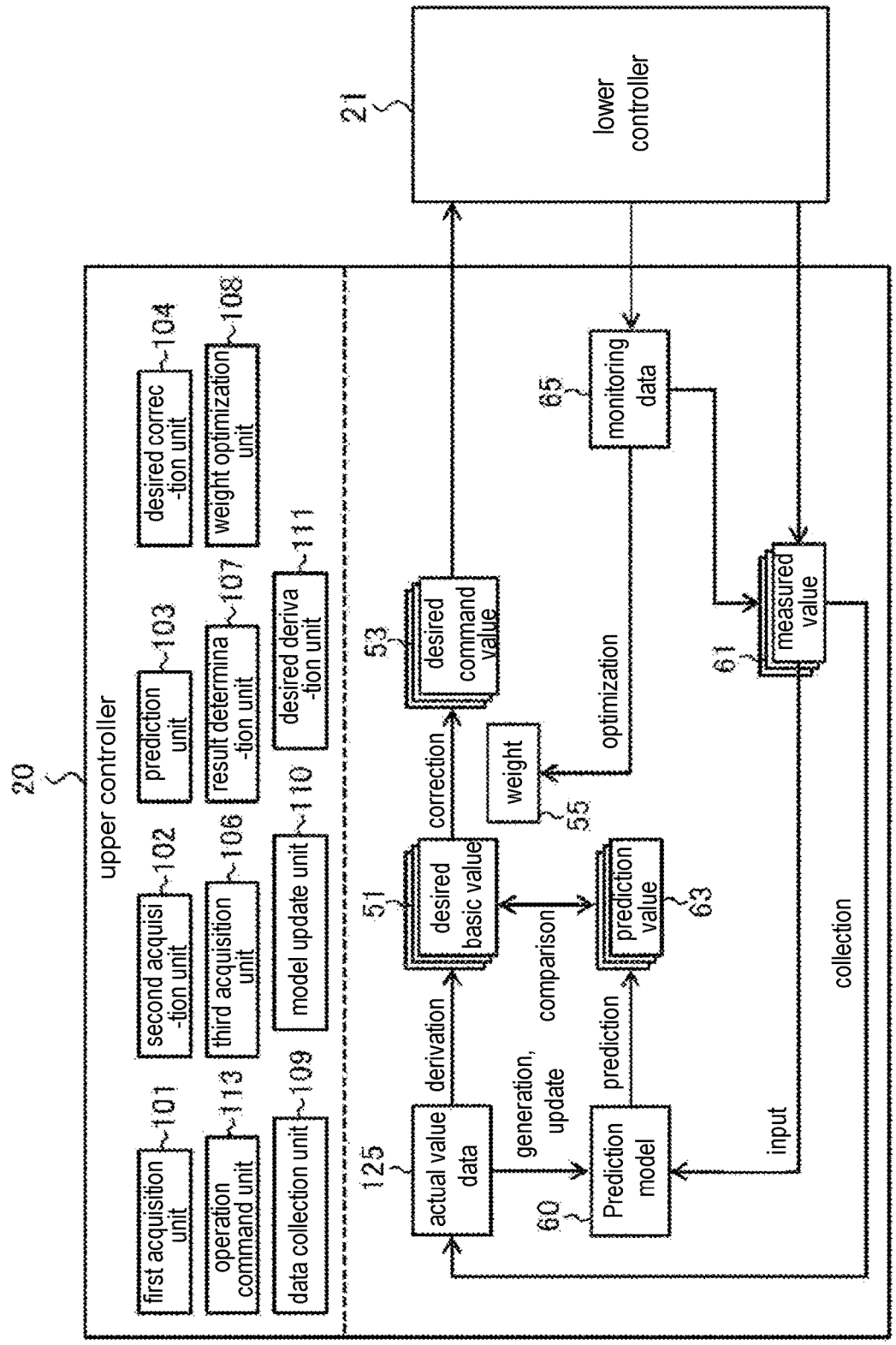
FIG. 9A schematically shows an example of a software configuration of an upper controller according to a modified example.
Figure 9B:
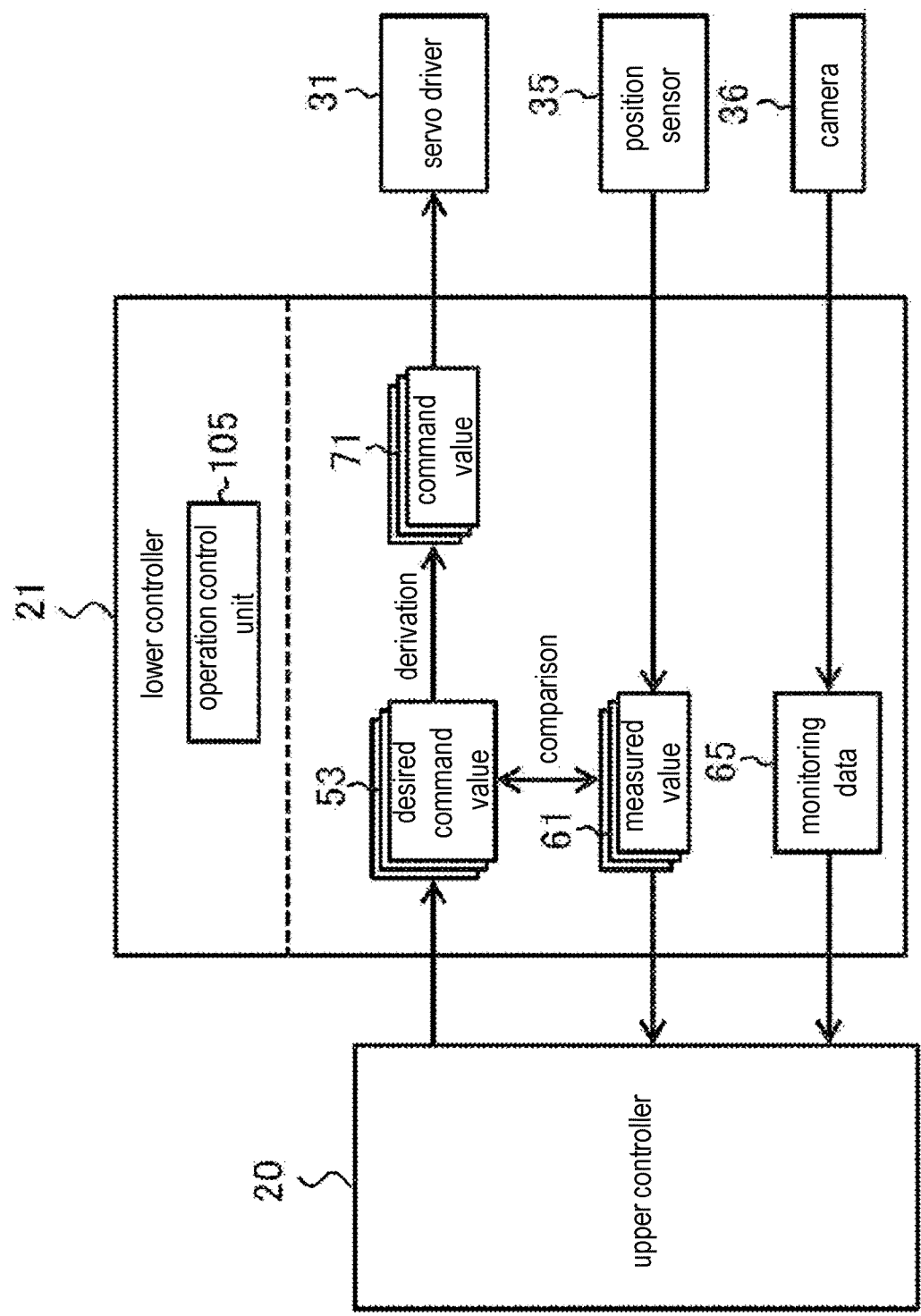
FIG. 9B schematically shows an example of a software configuration of a lower controller according to the modified example.

FIG. 9A schematically shows an example of the software configuration of the upper controller 20 according to this modified example. FIG. 9B schematically shows an example of the software configuration of the lower controller 21 according to this modified example. The software configuration of the upper controller 20 according to this embodiment is the same as the software configuration of the control device 1 except that an operation command unit 113 is provided instead of the operation control unit 105. The upper controller 20 is operated as a computer including each software module by executing a program stored in a storage unit by a processor. On the other hand, the lower controller 21 is operated as a computer including the operation control unit 105 as a software module by executing a program stored in a storage unit by a processor.

The upper controller 20 according to this modified example performs the same process as that of the control device 1 according to the above-described embodiment except for step S106. Instead of the process of step S106, the processor of the upper controller 20 is operated as the operation command unit 113, gives the determined desired command value 53 to the lower controller 21, and controls the lower controller 21 in accordance with the given desired command value 53 to control the operation of the device being controlled. In response to this, the processor of the lower controller 21 is operated as the operation control unit 105 and controls the operation of the device being controlled in accordance with the given desired command value 53 similarly to step S106. For example, the processor of the lower controller 21 determines the command value 71 in response to a difference between the desired command value 53 and the measured value 61 and gives the determined command value 71 to the device being controlled to control the operation of the device being controlled. Additionally, a process for the operation control unit 105 except for step S106 in the above-described embodiment may be performed by the operation command unit 113. Further, in this modified example, the measured value 61 of the control variable and the monitoring data 65 may be provided to the upper controller 20 via the lower controller 21. In this modified example, a conventional controller can be used in the lower controller 21. For that reason, according to this modified example, it is possible to reduce cost for applying the present invention.

<4. 3>

In the above-described embodiment, the prediction model 60 is configured to calculate the prediction value 63 from the measured value 61 of the control variable at the first time. However, the configuration of the prediction model 60 may not be limited to such an example. The prediction model 60 may be configured to generate the corrected desired value in response to the prediction value 63 of the predicted control variable with respect to the input of the measured value 61 of the control variable and the desired basic value 51. In this case, the corrected desired value corresponding to the measured value of the control variable is further used to generate the prediction model 60. The corrected desired value corresponding to the measured value of the control variable may be appropriately given.

Further, in the above-described embodiment, the prediction model 60 may be used to acquire the desired basic value 51 in step S101. That is, in step S101, the control unit 11 may acquire the output value output from the prediction model 60 as the desired basic value 51 at the second time after the first time by inputting the desired basic value 51 at the first time to the prediction model 60 and performing the calculation process of the prediction model 60.

Further, in the above-described embodiment, the control device 1 indirectly corrects the command value given to the device being controlled by correcting the desired basic value 51 of the control variable in response to the prediction value 63 of the control variable predicted by the prediction model 60. However, a method of correcting the command value may not be limited to such an example. For example, the command value may be directly corrected in response to the prediction value 63 of the control variable.

Figure 10:
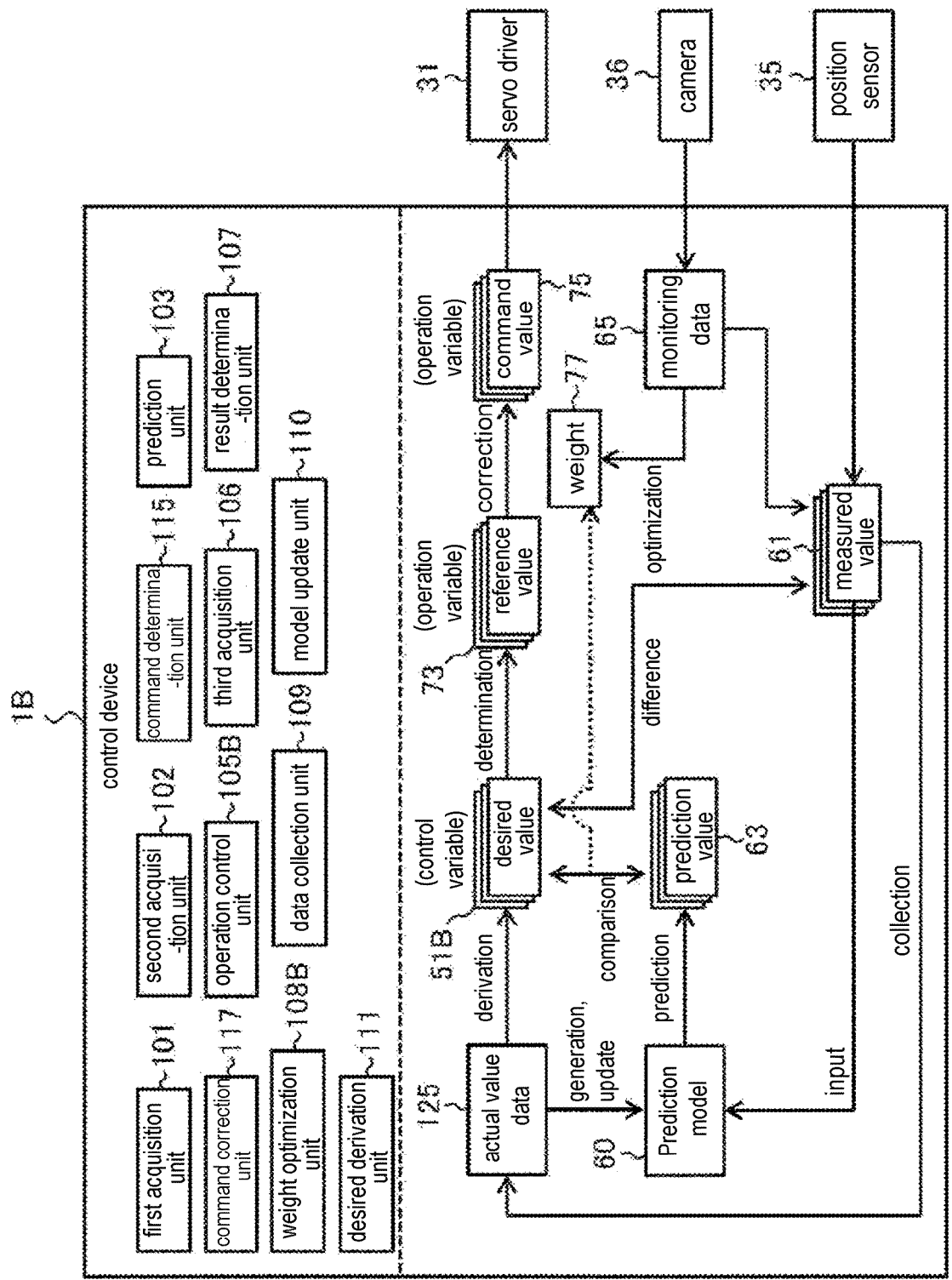
FIG. 10 schematically shows an example of a software configuration of a control device according to the modified example.

FIG. 10 schematically shows an example of a software configuration of a control device 1B according to this modified example. The control device 1 according to this modified example is configured similarly to the control device 1 according to the above-described embodiment except that the command value is directly corrected in response to the prediction value 63. A hardware configuration of the control device 1B may be the same as that of the control device 1 according to the above-described embodiment. Further, the software configuration of the control device 1B may be the same as that of the control device 1 according to the above-described embodiment except that a command determination unit 115 is further provided and a command correction unit 117 is provided instead of the desired correction unit 104.

The processor of the control device 1B according to this modified example may perform the processes of step S101 to step S103 similarly to the control device 1 according to the above-described embodiment. In step S101, the processor of the control device 1B acquires the desired value of the control variable 51B. The desired value 51B corresponds to the desired basic value 51. Instead of the processes of step S104 to step S106, the processor of the control device 1B is operated as the command determination unit 115, calculates a difference between the desired value 51B and the measured value 61, and determines a reference value 73 of the operation variable in response to the calculated difference. A method of determining the reference value 73 may be the same as that of step S106.

When the predictive control is not performed, the processor of the control device 1B is operated as an operation control unit 105B and gives the determined reference value 73 to the device being controlled as the command value to control the operation of the device being controlled. On the other hand, when the predictive control is performed, the processor of the control device 1B is operated as the prediction unit 103 and calculates the prediction value 63 of the control variable from the acquired measured value 61 by using the prediction model 60. Next, the processor of the control device 1B is operated as the command correction unit 117 and determines the command value 75 by correcting the reference value 73 in response to the calculated prediction value 63. The degree of correction is determined on the basis of the weight 77. The corrected variable of the reference value 73 may be calculated similarly to the above-described embodiment. For example, the corrected variable of the reference value 73 may be calculated by the same formula as in the above formula 1. In this case, the weight 77 includes the proportional constant and the constant term. Then, the processor of the control device 1B is operated as the operation control unit 105B and gives the determined command value 75 to the device being controlled to control the operation of the device being controlled.

Next, the processor of the control device 1B may perform the processes of step S107 to step S115. In step S110, the processor of the control device 1B is operated as a weight optimization unit 108B and optimizes the weight 77 of correction so that the device being controlled is appropriately operated on the basis of the assessment result of step S109. The optimization method may be similar to that of the above-described embodiment.

<4. 4>

In the above-described embodiment, at least one of the model update unit 110 and the desired derivation unit 111 may be omitted from the software configuration of the control device 1. When the model update unit 110 is omitted, the process of step S114 may be omitted from the process procedure of the control device 1. Further, when the desired derivation unit 111 is omitted, the process of step S115 may be omitted from the process procedure of the control device 1. When the processes of step S114 and step S115 are omitted from the process procedure of the control device 1, the process of step S113 may be omitted. Further, when the actual value data 125 is not used, the processes of step S111 and step S112 may be omitted from the process procedure of the control device 1. In this case, the data collection unit 109 may be omitted from the software configuration of the control device 1. Further, in the process procedure of the control device 1, the processes of step S101 to step S107 and the processes of step S108 to step S115 may be performed in parallel. The process procedure of each step may be appropriately changed.

In the above-described embodiment, after the control ends, the weight 55 of correction is optimized by step S110 and the prediction model 60 is updated by step S114. However, the timing of optimizing the weight 55 of correction and the timing of updating the prediction model 60 are not limited to these examples and may be appropriately selected in accordance with the embodiment. The optimization of the weight 55 of correction and the update of the prediction model 60 may be performed every takt cycle.

Further, in the above-described embodiment, the control device 1 updates the prediction model 60. However, the computer for updating the prediction model 60 may not be limited to the control device 1. The update of the prediction model 60 may be performed by other information processing devices. In this case, the control device 1 may acquire the updated prediction model 60 from other information processing devices, for example, via the external storage device, the storage medium 91, the network, or the like.

What is claimed is:

1. A control device comprising:
a first acquisition unit which acquires a desired basic value of a control variable;
a second acquisition unit which acquires a measured value of a control variable obtained by a first sensor measuring a control variable of a device being controlled;
a prediction unit which calculates a prediction value of the control variable from the acquired measured value using a prediction model of the control variable;
a desired correction unit which determines a desired command value of the control variable by correcting the desired basic value in response to the calculated prediction value and determines a degree of correction on the basis of a weight;
an operation control unit which controls an operation of the device being controlled in accordance with the determined desired command value;
a third acquisition unit which acquires monitoring data obtained by a second sensor monitoring an operation result of the device being controlled;
a result determination unit which assesses whether the device being controlled is appropriately operated by the control on the basis of the acquired monitoring data;
and a weight optimization unit which optimizes the weight of correction so that the device being controlled is appropriately operated on the basis of the assessment result;
wherein a plurality of candidates for the weight are given,
and wherein the weight optimization unit optimizes the weight of correction so that the device being controlled is appropriately operated by selecting a candidate of the weight having a highest probability that the device being controlled is appropriately operated as a result of controlling the operation of the device being controlled in accordance with each desired command value determined by a correction using the candidate of each weight.

2. The control device according to claim 1,
wherein the weight optimization unit optimizes the weight of correction to increase the probability that the device being controlled is appropriately operated by performing reinforcement learning based on a reward determined in response to the assessment result.

3. The control device according to claim 1,
wherein the desired correction unit calculates a difference between the desired basic value and the prediction value, determines a correction value on the basis of the calculated difference and the weight, and calculates the desired command value by adding the determined correction value to the desired basic value.

4. The control device according to claim 3,
wherein the weight comprises a proportional constant and a constant term, and
wherein the desired correction unit calculates a product of the difference and the proportional constant and adds the constant term to the calculated product to calculate the correction value.

5. The control device according to claim 1,
wherein the operation of the device being controlled by the control is repeated every takt cycle,
wherein the takt cycle comprises a first time interval and a second time interval after the first time interval,
wherein the first acquisition unit acquires a desired basic value of the control variable in the second time interval,
wherein the second acquisition unit acquires a measured value of the control variable in the first time interval,
wherein the prediction unit calculates the prediction value of the control variable in the second time interval from the measured value of the control variable in the first time interval using the prediction model,
wherein the desired correction unit determines the desired command value of the control variable in the second time interval by correcting the desired basic value in the second time interval in response to the calculated prediction value, and
wherein the operation control unit controls the operation of the device being controlled in the second time interval in accordance with the determined desired command value.

6. The control device according to claim 5,
wherein the prediction unit converts the measured value in the first time interval into a feature amount, inputs the converted feature amount to the prediction model, and performs a calculation process of the prediction model to acquire an output value output from the prediction model as the prediction value in the second time interval.

7. The control device according to claim 1, further comprising:
a data collection unit which collects the measured value of the control variable obtained by the first sensor during control assessing that the device being controlled is appropriately operated as actual value data; and
a model update unit which updates the prediction model on the basis of the collected actual value data.

8. The control device according to claim 7, further comprising:
a desired derivation unit which derives the desired value of the control variable for appropriately controlling the device being controlled on the basis of the collected actual value data,
wherein the first acquisition unit acquires the derived desired value as the desired basic value.

9. The control device according to claim 1,
wherein the operation control unit calculates a difference between the desired command value and the measured value, determines a value of the operation variable in response to the calculated difference, and gives the determined value of the operation variable to the device being controlled to control the operation of the device being controlled.

10. The control device according to claim 1,
wherein the device being controlled is a press machine comprising a mold,
wherein the control variable is a position of the mold,
wherein the first sensor is a position sensor configured to measure the position of the mold, and
wherein the second sensor is a camera disposed to photograph a workpiece pressed by the press machine.

11. A control method comprising:
acquiring a desired basic value of a control variable;
acquiring a measured value of a control variable obtained by a first sensor measuring a control variable of a device being controlled;
calculating a prediction value of the control variable from the acquired measured value using a prediction model of the control variable;
determining a desired command value of the control variable by correcting the desired basic value in response to the calculated prediction value and determining a degree of correction on the basis of a weight;
controlling an operation of the device being controlled in accordance with the determined desired command value;
acquiring monitoring data obtained by a second sensor monitoring an operation result of the device being controlled;
assessing whether the device being controlled is appropriately operated by the control on the basis of the acquired monitoring data; and
optimizing the weight of correction so that the device being controlled is appropriately operated on the basis of the assessment result;
wherein a plurality of candidates for the weight are given,
and wherein the optimizing the weight of correction so that the device being controlled is appropriately operated by selecting a candidate of the weight having a highest probability that the device being controlled is appropriately operated as a result of controlling the operation of the device being controlled in accordance with each desired command value determined by a correction using the candidate of each weight.

12. A non-transitory computer readable recording medium storing a control program allowing a computer to perform:
acquiring a desired basic value of a control variable;
acquiring a measured value of a control variable obtained by a first sensor measuring a control variable of a device being controlled;
calculating a prediction value of the control variable from the acquired measured value using a prediction model of the control variable;
determining a desired command value of the control variable by correcting the desired basic value in response to the calculated prediction value and determining a degree of correction on the basis of a weight;
controlling an operation of the device being controlled in accordance with the determined desired command value;
acquiring monitoring data obtained by a second sensor monitoring an operation result of the device being controlled;
assessing whether the device being controlled is appropriately operated by the control on the basis of the acquired monitoring data; and
optimizing the weight of correction so that the device being controlled is appropriately operated on the basis of the assessment result;
wherein a plurality of candidates for the weight are given,
and wherein the optimizing the weight of correction so that the device being controlled is appropriately operated by selecting a candidate of the weight having a highest probability that the device being controlled is appropriately operated as a result of controlling the operation of the device being controlled in accordance with each desired command value determined by a correction using the candidate of each weight.

* * * * *